(12) United States Patent
Spizhevoy et al.

(10) Patent No.: US 11,100,644 B2
(45) Date of Patent: Aug. 24, 2021

(54) NEURAL NETWORK FOR EYE IMAGE SEGMENTATION AND IMAGE QUALITY ESTIMATION

(71) Applicant: Magic Leap, Inc., Plantation, FL (US)

(72) Inventors: Alexey Spizhevoy, Nizhny Novgorod (RU); Adrian Kaehler, Los Angeles, CA (US); Vijay Badrinarayanan, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/570,418

(22) Filed: Sep. 13, 2019

(65) Prior Publication Data

US 2020/0005462 A1 Jan. 2, 2020

Related U.S. Application Data

(63) Continuation of application No. 15/605,567, filed on May 25, 2017, now Pat. No. 10,445,881.

(30) Foreign Application Priority Data

Sep. 29, 2016 (RU) ............................ RU2016138608

(51) Int. Cl.
*G06T 7/00* (2017.01)
*G06T 7/10* (2017.01)
(Continued)

(52) U.S. Cl.
CPC .............. *G06T 7/10* (2017.01); *G06K 9/0061* (2013.01); *G06K 9/00617* (2013.01);
(Continued)

(58) Field of Classification Search
CPC ... G06T 7/10; G06T 7/11; G06T 7/194; G06T 7/12; G06T 7/0002; G06T 2207/10024;
(Continued)

(56) References Cited

U.S. PATENT DOCUMENTS 5,291,560 A 3/1994 Daugman
5,583,795 A 12/1996 Smyth
(Continued)

FOREIGN PATENT DOCUMENTS

WO WO 2014/182769 11/2014
WO WO 2015/164807 10/2015
WO WO 2018/063451 4/2018

OTHER PUBLICATIONS

"Camera Calibration and 3D Reconstruction", OpenCV, retrieved May 5, 2016, from <http://docs.opencv.org/2.4/modules/calib3d/doc/camera_calibration_and_3d_reconstruction.html> in 53 pages.
(Continued)

*Primary Examiner* — Ping Y Hsieh
(74) *Attorney, Agent, or Firm* — Knobbe, Martens, Olson & Bear, LLP

(57) ABSTRACT

Systems and methods for eye image segmentation and image quality estimation are disclosed. In one aspect, after receiving an eye image, a device such as an augmented reality device can process the eye image using a convolutional neural network with a merged architecture to generate both a segmented eye image and a quality estimation of the eye image. The segmented eye image can include a background region, a sclera region, an iris region, or a pupil region. In another aspect, a convolutional neural network with a merged architecture can be trained for eye image segmentation and image quality estimation. In yet another aspect, the device can use the segmented eye image to determine eye contours such as a pupil contour and an iris contour. The device can use the eye contours to create a polar image of the iris region for computing an iris code or biometric authentication.

25 Claims, 18 Drawing Sheets

(51) Int. Cl.
*G06T 7/11* (2017.01)
*G06T 7/194* (2017.01)
*G06K 9/46* (2006.01)
*G06T 7/12* (2017.01)
*G06K 9/62* (2006.01)
*G06K 9/00* (2006.01)
*G06K 9/03* (2006.01)

(52) U.S. Cl.
CPC .......... *G06K 9/036* (2013.01); *G06K 9/4628* (2013.01); *G06K 9/4652* (2013.01); *G06K 9/627* (2013.01); *G06T 7/0002* (2013.01); *G06T 7/11* (2017.01); *G06T 7/12* (2017.01); *G06T 7/194* (2017.01); *G06T 2207/10024* (2013.01); *G06T 2207/20076* (2013.01); *G06T 2207/20081* (2013.01); *G06T 2207/20084* (2013.01); *G06T 2207/30041* (2013.01); *G06T 2207/30168* (2013.01); *G06T 2207/30196* (2013.01)

(58) Field of Classification Search
CPC . G06T 2207/30041; G06T 2207/20081; G06T 2207/30168; G06T 2207/20076; G06T 2207/20084; G06T 2207/30196; G06K 9/4652; G06K 9/627; G06K 9/00617; G06K 9/036; G06K 9/4628; G06K 9/0061
See application file for complete search history.

(56) References Cited

U.S. PATENT DOCUMENTS

| | | |
|---|---|---|
| 6,850,221 B1 | 2/2005 | Tickle |
| 7,771,049 B2 | 8/2010 | Knaan et al. |
| 7,970,179 B2 | 6/2011 | Tosa |
| 8,098,891 B2 | 1/2012 | Lv et al. |
| 8,341,100 B2 | 12/2012 | Miller et al. |
| 8,345,984 B2 | 1/2013 | Ji et al. |
| 8,363,783 B2 | 1/2013 | Gertner et al. |
| 8,845,625 B2 | 9/2014 | Angeley et al. |
| 8,950,867 B2 | 2/2015 | Macnamara |
| 9,141,916 B1 | 9/2015 | Corrado et al. |
| 9,215,293 B2 | 12/2015 | Miller |
| 9,262,680 B2 | 2/2016 | Nakazawa et al. |
| 9,310,559 B2 | 4/2016 | Macnamara |
| 9,348,143 B2 | 5/2016 | Gao et al. |
| D758,367 S | 6/2016 | Natsume |
| 9,417,452 B2 | 8/2016 | Schowengerdt et al. |
| 9,430,829 B2 | 8/2016 | Madabhushi et al. |
| 9,791,700 B2 | 10/2017 | Schowengerdt et al. |
| 10,445,881 B2 | 10/2019 | Spizhevoy et al. |
| 2004/0130680 A1 | 7/2004 | Zhou et al. |
| 2006/0028436 A1 | 2/2006 | Armstrong |
| 2006/0088193 A1 | 4/2006 | Muller et al. |
| 2006/0147094 A1 | 7/2006 | Yoo |
| 2007/0081123 A1 | 4/2007 | Lewis |
| 2007/0140531 A1 | 6/2007 | Hamza |
| 2011/0182469 A1 | 7/2011 | Ji et al. |
| 2012/0127062 A1 | 5/2012 | Bar-Zeev et al. |
| 2012/0162549 A1 | 6/2012 | Gao et al. |
| 2012/0163678 A1 | 6/2012 | Du et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0161325 A1* | 6/2014 | Bergen ............... G06K 9/00885 382/117 |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0270405 A1 | 9/2014 | Derakhshani et al. |
| 2014/0279774 A1 | 9/2014 | Wang et al. |
| 2014/0306866 A1 | 10/2014 | Miller et al. |
| 2014/0380249 A1 | 12/2014 | Fleizach |
| 2015/0016777 A1 | 1/2015 | Abovitz et al. |
| 2015/0103306 A1 | 4/2015 | Kaji et al. |
| 2015/0117760 A1 | 4/2015 | Wang et al. |
| 2015/0125049 A1 | 5/2015 | Taigman et al. |
| 2015/0134583 A1 | 5/2015 | Tamatsu et al. |
| 2015/0170002 A1 | 6/2015 | Szegedy et al. |
| 2015/0178939 A1 | 6/2015 | Bradski et al. |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0278642 A1 | 10/2015 | Chertok et al. |
| 2015/0302652 A1 | 10/2015 | Miller et al. |
| 2015/0309263 A2 | 10/2015 | Abovitz et al. |
| 2015/0324974 A1* | 11/2015 | Garber ................ G06K 9/0061 382/128 |
| 2015/0326570 A1 | 11/2015 | Publicover et al. |
| 2015/0338915 A1 | 11/2015 | Publicover et al. |
| 2015/0346490 A1 | 12/2015 | Tekolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0034811 A1 | 2/2016 | Paulik et al. |
| 2016/0035078 A1 | 2/2016 | Lin et al. |
| 2016/0098844 A1 | 4/2016 | Shaji et al. |
| 2016/0104053 A1 | 4/2016 | Yin et al. |
| 2016/0104056 A1 | 4/2016 | He et al. |
| 2016/0135675 A1 | 5/2016 | Du et al. |
| 2016/0162782 A1 | 6/2016 | Park |
| 2017/0053165 A1 | 2/2017 | Kaehler |
| 2018/0018451 A1 | 1/2018 | Spizhevoy et al. |
| 2018/0018515 A1 | 1/2018 | Spizhevoy et al. |
| 2018/0089834 A1 | 3/2018 | Spizhevoy et al. |

OTHER PUBLICATIONS

"Camera calibration with OpenCV", OpenCV, retrieved May 5, 2016, in 12 pages. URL: http://docs.opencv.org/2.4/doc/tutorials/calib3d/camera_calibration/camera_calibration.htrnl.

"Camera calibration with OpenCV", OpenCV, retrieved May 5, 2016, in 7 pages. URL: http://docs.opencv.org/3.1.0/d4/d94/tutorial_camera_calibration.html#gsc.tab=0.

"Convolution". Wikipedia, accessed Oct. 1, 2017, in 17 pages. URL: https://en.wikipedia.org/wiki/Convolution.

"Deep Learning", Wikipedia, printed Oct. 3, 2017, in 23 pages. URL: https://en.wikipedia.org/wiki/Deep_learning.

"Feature Extraction Using Convolution", Ufldl, printed Sep. 1, 2016, in 3 pages. URL:http://deeplearning.stanford.edu/wiki/index.php/Feature_ extraction_ using_ convolution.

"Machine Learning", Wikipedia, printed Oct. 3, 2017, in 14 pages. URL: https://en.wikipedia.org/wiki/Machine_learning.

"Transfer Function Layers", GitHub, Dec. 1, 2015, in 13 pages; accessed URL: http://github.com/torch/nn/blob/master/doc/transfer.md.

Adegoke et al., "Iris Segmentation: A Survey", Int J Mod Engineer Res. (IJMER) (Aug. 2013) 3(4): 1885-1889.

Anthony, S., "MIT releases open-source software that reveals invisible motion and detail in video", Extreme Tech, Feb. 28, 2013, as archived Aug. 4, 2017, in 5 pages.

Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.

Aubry M. et al., "Seeing 3D chairs: e emplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.

Badrinarayanan et al., "SegNet: A Deep Convolutional Encoder-Decoder Architecture for Image Segmentation", IEEE (Dec. 8, 2015); arXiv: eprint arXiv:1511.00561v2 in 14 pages.

Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.

(56) References Cited

OTHER PUBLICATIONS

Belagiannis V. et al., "Recurrent Human Pose Estimation", In Automatic Face & Gesture Recognition; 12th IEEE International Conference—May 2017, arXiv eprint arXiv:1605.02914v3; (Aug. 5, 2017) Open Access Version in 8 pages.

Bell S. et al., "Inside-Outside Net: Detecting Objects in Conte t with Skip Pooling and Recurrent Neural Networks", In Proceedings of the IEEE Conference on Computer Vision and Pattern Recognition, Jun. 27-30, 2016; pp. 2874-2883.

Biederman I., "Recognition-by-Components: A Theory of Human Image Understanding", Psychol Rev. (Apr. 1987) 94(2): 115-147.

Bouget, J., "Camera Calibration Toolbox for Matlab" Cal-Tech, Dec. 2, 2013, in 5 pages. URL: https://www.vision.caltech.edu/bouguetj/calib_doc/index.html#parameters.

Bulat A. et al., "Human pose estimation via Convolutional Part Heatmap Regression", arXiv e-print arXiv:1609.01743v1 , Sep. 6, 2016 in 16 pages.

Carreira J. et al., "Human Pose Estimation with Iterative Error Feedback", In Proceedings of the IEEE Conference on Computer Vision and Pattern Recognition, Jun. 27-30, 2016, pp. 4733-4742.

Chatfield et al., "Return of the Devil in the Details: Delving Deep into Convolutional Nets", arXiv eprint arXiv:1405.3531v4, Nov. 5, 2014 in 11 pages.

Chen X. et al., "3D Object Proposals for Accurate Object Class Detection", in *Advances in Neural Information Processing Systems*, (2015) Retrieved from <http://papers.nips,cc/paper/5644-3d-object-proposals-for-accurate-object-class-detection.pdf>; 11 pages.

Choy et al., "3D-R2N2: A Unified Approach for Single and Multi-view 3D Object Reconstruction", arXiv; eprint arXiv:1604.00449v1, Apr. 2, 2016 in 17 pages.

Collet et al., "The MOPED framework: Object Recognition and Pose Estimation for Manipulation", The International Journal of Robotics Research. (Sep. 2011) 30(10):1284-306; preprint Apr. 11, 2011 in 22 pages.

Crivellaro A. et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).

Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).

Dai J. et al., "R-FCN: Object Detection via Region-based Fully Convolutional Networks", in *Advances in neural information processing systems*; (Jun. 21, 2016) Retrieved from <https://arxiv.org/pdf/1605.06409.pdf in 11 pages.

Daugman, J. et al., "Epigenetic randomness, complexity and singularity of human iris patterns", Proceedings of Royal Society: Biological Sciences, vol. 268, Aug. 22, 2001, in 4 pages.

Daugman, J., "How Iris Recognition Works", IEEE Transactions on Circuits and Systems for Video Technology, vol. 14, No. 1, Jan. 2004, in 10 pages.

Daugman, J., "New Methods in Iris Recognition," IEEE Transactions on Systems, Man, and Cybernetics—Part B: Cybernetics, vol. 37, No. 5, Oct. 2007, in 9 pages.

Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.

Detone D. et al., "Deep Image Homography Estimation", arXiv eprint arXiv:1606.03798v1, Jun. 13, 2016 in 6 pages.

Dwibedi et al., "Deep Cuboid Detection: Beyond 2D Bounding Boxes", arXiv eprint arXiv:1611.10010v1; Nov. 30, 2016 in 11 pages.

Everingham M. et al., "The PASCAL Visual Object Classes (VOC) Challenge", Int J Comput Vis (Jun. 2010) 88(2):303-38.

Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.

Fidler S. et al., "3D Object Detection and Viewpoint Estimation with a Deformable 3D Cuboid Model", Proceedings of the 25th International Conference on Neural Information Processing Systems, (Dec. 3-6, 2012), pp. 611-619.

Fouhey D. et al., "Data-Driven 3D Primitives for Single Image Understanding", Proceedings of the IEEE International Conference on Computer Vision, Dec. 1-8, 2013; pp. 3392-3399.

Geiger A. et al., "Joint 3D Estimation of Objects and Scene Layout", In Advances in Neural Information Processing Systems 24; Dec. 17, 2011 in 9 pages.

Gidaris S. et al., "Object detection via a multi-region & semantic segmentation-aware CNN model", in Proceedings of the IEEE International Conference on Computer Vision; Dec. 7-13, 2015 (pp. 1134-1142).

Girshick R. et al., "Fast R-CNN", Proceedings of the IEEE International Conference on Computer Vision; Dec. 7-13, 2015 (pp. 1440-1448).

Girshick R. et al., "Rich feature hierarchies for accurate object detection and semantic segmentation", Proceedings of the IEEE Conference on Computer Vision and Pattern Recognition, Jun. 23-28, 2014 (pp. 580-587).

Gupta A. et al., "Blocks World Revisited: Image Understanding Using Qualitative Geometry and Mechanics", in European Conference on Computer Vision; Sep. 5, 2010 in 14 pages.

Gupta A. et al., "From 3D Scene Geometry to Human Workspace", in Computer Vision and Pattern Recognition (CVPR); IEEE Conference on Jun. 20-25, 2011 (pp. 1961-1968).

Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).

Gupta S. et al., "Inferring 3D Object Pose in RGB-D Images", arXiv e-print arXiv:1502.04652v1, Feb. 16, 2015 in 13 pages.

Gupta S. et al., "Learning Rich Features from RGB-D Images for Object Detection and Segmentation", in *European Conference on Computer Vision*; (Jul. 22, 2014); Retrieved from <https://arxiv.org/pdf/1407.5736.pdf> in 16 pages.

Han et al, "Deep Compression: Compressing Deep Neural Networks with Pruning, Trained Quantization and Huffman Coding", arXiv eprint arXiv:1510.00149v5, Feb. 15, 2016 in 14 pages.

Hansen, D. et al., "In the Eye of the Beholder: A Survey of Models for Eyes and Gaze", IEEE Transactions on Pattern Analysis and Machine Intelligence, vol. 32, No. 3, , Mar. 2010, in 23 pages.

Hartley R. et al., *Multiple View Geometry in Computer Vision*, 2nd Edition; Cambridge University Press, (Apr. 2004); in 673 pages.

He et al., "Delving Deep into Rectifiers: Surpassing Human-level Performance on ImageNet Classification", arXiv: eprint arXiv:1502.01852v1, Feb. 6, 2015 in 11 pages.

He et al., "Spatial Pyramid Pooling in Deep Convolutional Networks for Visual Recognition", arXiv eprint arXiv:1406.4729v2; Aug. 29, 2014 in 14 pages.

Hedau V. et al., "Recovering Free Space of Indoor Scenes from a Single Image", in *Computer Vision and Pattern Recognition* (CVPR), IEEE Conference Jun. 16-21, 2012 (pp. 2807-2814).

Hejrati et al., "Categorizing Cubes: Revisiting Pose Normalization", Applications of Computer Vision (WACV), 2016 IEEE Winter Conference, Mar. 7-10, 2016 in 9 pages.

Hijazi, S. et al., "Using Convolutional Neural Networks for Image Recognition", Tech Rep. (Sep. 2015) available online URL: http://ip.cadence.com/uploads/901/cnn-wp-pdf, in 12 pages.

Hoffer et al., "Deep Metric Learning Using Triplet Network", International Workshop on Similarity-Based Pattern Recognition [ICLR]; Nov. 25, 2015; [online] retrieved from the Internet <https://arxiv.org/abs/1412.6622>; pp. 84-92.

Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 pages.

Hsiao E. et al., "Making specific features less discriminative to improve point-based 3D object recognition", in *Computer Vision and Pattern Recognition* (CVPR). IEEE Conference, Jun. 13-18, 2010 (pp. 2653-2660).

(56) References Cited

OTHER PUBLICATIONS

Huang et al., "Sign Language Recognition Using 3D Convolutional Neural Networks", University of Science and Technology of China, 2015 IEEE International Conference on Multimedia and Expo. Jun. 29-Jul. 3, 2015, in 6 pages.
Iandola F. et al., "SqueezeNet: AlexNet-level accuracy with 50x fewer parameters and <1MB model size", arXiv eprint arXiv:1602.07360v1, Feb. 24, 2016 in 5 pages.
Ioffe S. et al., "Batch Normalization: Accelerating Deep Network Training by Reducing Internal Covariate Shift", International Conference on Machine Learning (Jun. 2015); arXiv: eprint arXiv:1502.03167v3, Mar. 2, 2015 in 11 pages.
Jarrett et al., "What is the Best Multi-Stage Architecture for Object Recognition?", In Computer Vision IEEE 12th International Conference Sep. 29-Oct. 2, 2009, pp. 2146-2153.
Ji, H. et al., "3D Convolutional Neural Networks for Human Action Recognition", IEEE Transactions on Pattern Analysis and Machine Intelligence, vol. 35:1, Jan. 2013, in 11 pages.
Jia et al., "3D-Based Reasoning with Blocks, Support, and Stability", Proceedings of the IEEE Conference on Computer Vision and Pattern Recognition; Jun. 23-28, 2013 in 8 pages.
Jia et al., "Caffe: Convolutional Architecture for Fast Feature Embedding", arXiv e-print arXiv:1408.5093v1, Jun. 20, 2014 in 4 pages.
Jiang H. et al., "A Linear Approach to Matching Cuboids in RGBD Images", in *Proceedings of the IEEE Conference on Computer Vision and Pattern Recognition*. Jun. 23-28, 2013 (pp. 2171-2178).
Jillela et al., "An Evaluation of Iris Segmentation Algorithms in Challenging Periocular Images", Handbook of Iris Recognition, Springer Verlag, Heidelberg (Jan. 12, 2013) in 28 pages.
Kar a. et al., "Category-specific object reconstruction from a single image", in *Proceedings of the IEEE Conference on Computer Vision and Pattern Recognition*. Jun. 7-12, 2015 (pp. 1966-1974).
Krizhevsky et al., "ImageNet Classification with Deep Convolutional Neural Networks", Advances in Neural Information Processing Systems. Apr. 25, 2013, pp. 1097-1105.
Lavin, A. et al.: "Fast Algorithms for Convolutional Neural Networks", Proceedings of the IEEE Conference on Computer Vision and Pattern Recognition, arXiv: eprint arXiv:1509.09308v2; Nov. 10, 2016 in 9 pages.
Lee D. et al., "Geometric Reasoning for Single Image Structure Recovery", in IEEE Conference Proceedings in Computer Vision and Pattern Recognition (CVPR) Jun. 20-25, 2009, pp. 2136-2143.
Lim J. et al., "FPM: Fine pose Parts-based Model with 3D CAD models", European Conference on Computer Vision; Springer Publishing, Sep. 6, 2014, pp. 478-493.
Liu et al., "ParseNet: Looking Wider to See Better", arXiv eprint arXiv:1506.04579v1; Jun. 15, 2015 in 9 pages.
Liu W. et al., "SSD: Single Shot MultiBox Detector", arXiv e-print arXiv:1512.02325v5, Dec. 29, 2016 in 17 pages.
Long et al., "Fully Convolutional Networks for Semantic Seqmentation", Proceedings of the IEEE Conference on Computer Vision and Pattern Recognition (Jun. 7-12, 2015) in 10 pages.
Pavlakos G. et al., "6-dof object pose from semantic keypoints", in arXiv preprint Mar. 14, 2017; Retrieved from <http://www.cis.upenn.edu/~kostas/mypub.dir/pavlakos17icra.pdf> in 9 pages.
Rastegari M. et al., "XNOR-Net: ImageNet Classification Using Binary Convolutional Neural Networks", arXiv eprint arXiv:1603.05279v4; Aug. 2, 2016 in 17 pages.
Redmon J. et al., "You Only Look Once: Unified, Real-Time Object Detection", Proceedings of the IEEE Conference on Computer Vision and Pattern Recognition (Jun. 27-30, 2016) pp. 779-788.
Ren S. et al., "Faster R-CNN: Towards real-time object detection with region proposal networks", arXiv eprint arXiv:1506.01497v3; Jan. 6, 2016 in 14 pages.
Ren, J. et al.: "On Vectorization of Deep Convolutional Neural Networks for Vision Tasks," Association for the Advancement of Artificial Intelligence; arXiv: eprint arXiv:1501.07338v1, Jan. 29, 2015 in 8 pages.
Roberts L. et al., "Machine Perception of Three-Dimensional Solids", Doctoral Thesis MIT; Jun. 1963 in 82 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtu.be.
Savarese S. et al., "3D generic object categorization, localization and pose estimation", in *Computer Vision*, IEEE 11th International Conference; Oct. 14-21, 2007, in 8 pages.
Saxena A., "Convolutional Neural Networks (CNNS): An Illustrated Explanation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv eprint arXiv:1503.03832v3, Jun. 17, 2015 in 10 pages.
Shafiee et al., "ISAAC: A Convolutional Neural Network Accelerator with In-Situ Analog Arithmetic in Crossbars", ACM Sigarch Comp. Architect News (Jun. 2016) 44(3):14-26.
Shao T. et al., "Imagining the Unseen: Stability-based Cuboid Arrangements for Scene Understanding", ACM Transactions on Graphics. (Nov. 2014) 33(6) in 11 pages.
Simonyan K. et al., "Very deep convolutional networks for large-scale image recognition", arXiv eprint arXiv:1409.1556v6, Apr. 10, 2015 in 14 pages.
Song S. et al., "Deep Sliding Shapes for Amodal 3D Object Detection in RGB-D Images", Proceedings of the IEEE Conference on Computer Vision and Pattern Recognition. Jun. 27-30, 2016 (pp. 808-816).
Song S. et al., "Sliding Shapes for 3D Object Detection in Depth Images", in European Conference on Computer Vision, (Sep. 6, 2014) Springer Publishing (pp. 634-651).
Su H. et al., "Render for CNN: Viewpoint Estimation in Images Using CNNs Trained with Rendered 3D Model Views", in Proceedings of the IEEE International Conference on Computer Vision, Dec. 7-13, 2015 (pp. 2686-2694).
Szegedy et al., "Going deeper with convolutions", The IEEE Conference on Computer Vision and Pattern Recognition; arXiv, eprint arXiv:1409.4842v1, Sep. 17, 2014 in 12 pages.
Szegedy et al., "Rethinking the Inception Architecture for Computer Vision", arXiv eprint arXIV:1512.00567v3, Dec. 12, 2015 in 10 pages.
Tulsiani S. et al., "Viewpoints and Keypoints", Proceedings of the IEEE Conference on Computer Vision and Pattern Recognition; Jun. 7-12, 2015 (pp. 1510-1519).
Villanueva, A. et al., "A Novel Gaze Estimation System with One Calibration Point", IEEE Transactions on Systems, Man, and Cybernetics-Part B:Cybernetics, vol. 38:4, Aug. 2008, in 16 pages.
Wilczkowiak M. et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.
Wu J. et al., "Single Image 3D Interpreter Network", European Conference in Computer Vision; arXiv eprint arXiv:1604.08685v2, Oct. 4, 2016 in 18 pages.
Xiang Y. et al., "Data-Driven 3D Voxel Patterns for Object Category Recognition", in Proceedings of the IEEE Conference on Computer Vision and Pattern Recognition, Jun. 7-12, 2015 (pp. 1903-1911).
Xiao J. et al., "Localizing 3D cuboids in single-view images", in Advances in Neural Information Processing Systems; Apr. 25, 2013 in 9 pages.
Yang Y. et al., "Articulated human detection with flexible mixtures of parts", IEEE Transactions on Pattern Analysis and Machine Intelligence. Dec. 2013; 35(12):2878-90.
Zheng Y. et al., "Interactive Images: Cuboid Proxies for Smart Image Manipulation", ACM Trans Graph. (Jul. 2012) 31(4):99-109.
International Search Report and Written Opinion for PCT Application No. PCT/US2015/29679, dated Jul. 6, 2017.
International Search Report and Written Opinion for PCT Application No. PCT/US17/29699, dated Sep. 8, 2017.
International Search Report and Written Opinion for PCT Application No. PCT/US2017/034482, dated Aug. 2, 2017.

(56) References Cited

OTHER PUBLICATIONS

International Search Report and Written Opinion for PCT Application No. PCT/US2017/048068, dated Nov. 20, 2017.
International Search Report and Written Opinion for PCT Application No. PCT/US2017/054987, dated Dec. 12, 2017.
International Search Report and Written Opinion for PCT Application No. PCT/US2017/061618, dated Jan. 17, 2018.
International Preliminary Report on Patentability for PCT Application No. PCT/US2017/034482, dated Apr. 2, 2019.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Jou, et al., "Deep Cross Residual Learning for Multitask Visual Recognition," Arxiv.org. Cornell University Library, 201 OLIN Library XP080693514, Apr. 5, 2016.
Mottalli, et al., "Flexible Image Segmentation and Quality Assessment for Real-Time Iris Recognition," Image Processing (ICIP), 2009 16th IEEE International Conference, Nov. 7, 2009.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

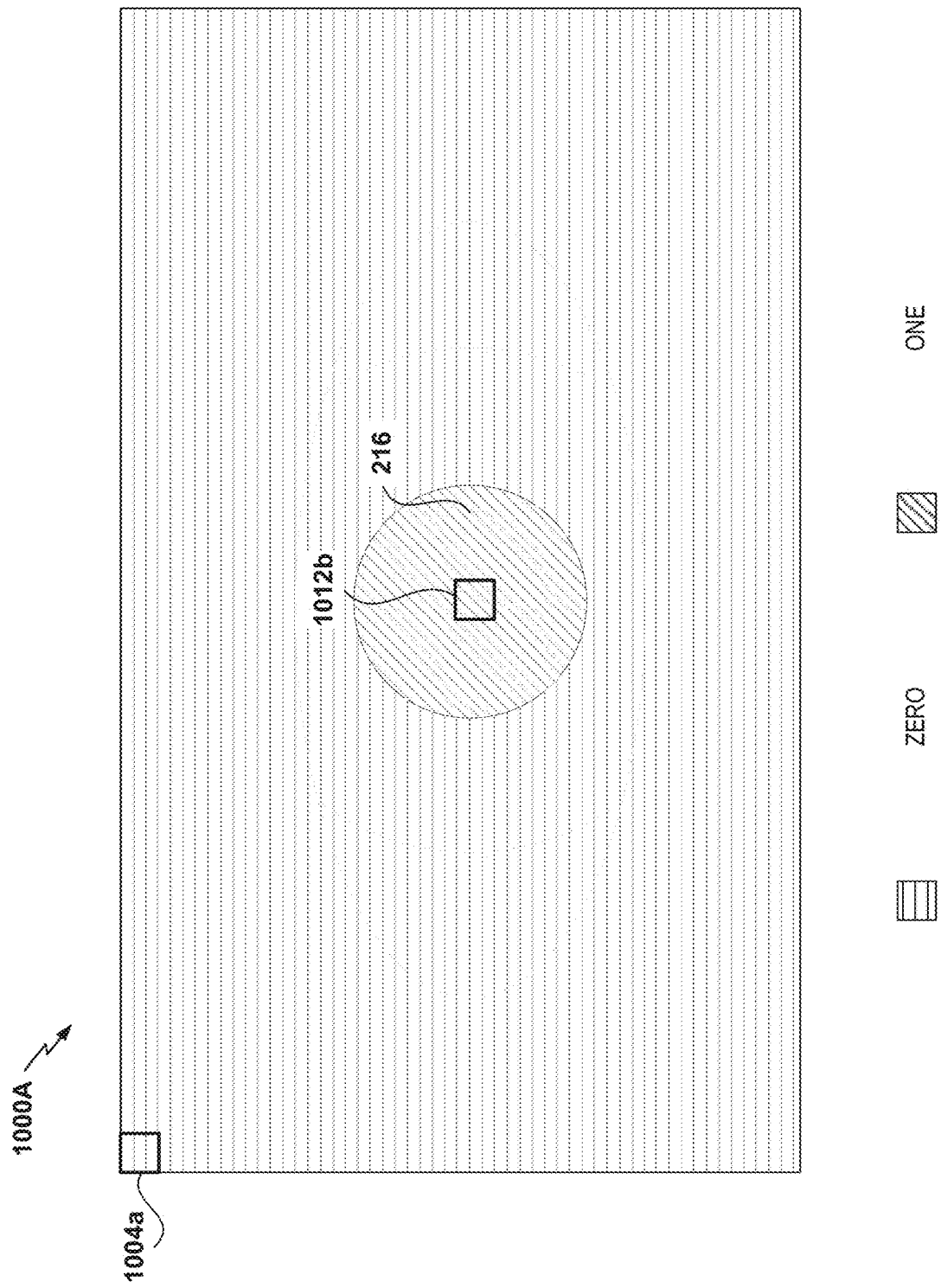

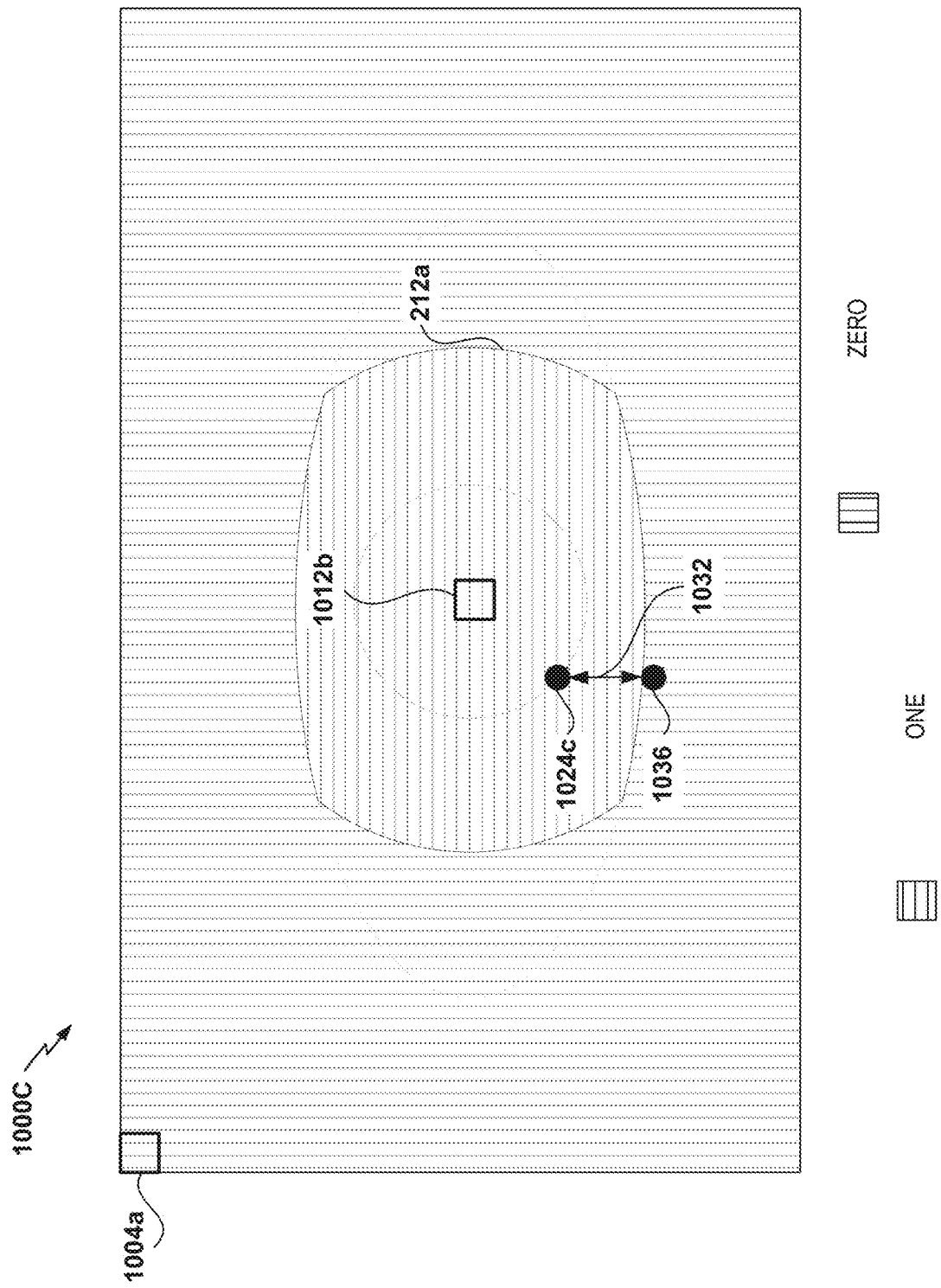

NEURAL NETWORK FOR EYE IMAGE SEGMENTATION AND IMAGE QUALITY ESTIMATION

CROSS-REFERENCE TO RELATED APPLICATIONS

This application is a continuation of U.S. application Ser. No. 15/605,567, filed May 25, 2017, entitled NEURAL NETWORK FOR EYE IMAGE SEGMENTATION AND IMAGE QUALITY ESTIMATION, which claims the benefit of priority to Russian Patent Application Number 2016138608, filed Sep. 29, 2016, entitled NEURAL NETWORK FOR EYE IMAGE SEGMENTATION AND IMAGE QUALITY ESTIMATION; the disclosures of which are hereby incorporated by reference herein in their entireties.

BACKGROUND

Field

The present disclosure relates generally to systems and methods for eye image segmentation and more particularly to using a convolutional neural network for both eye image segmentation and image quality estimation.

Description of the Related Art

In the field of personal biometric identification, one of the most effective known methods is to use the naturally occurring patterns in the human eye, predominantly the iris or the retina. In both the iris and the retina, patterns of color, either from the fibers of the stroma in the case of the iris or from the patterns of blood vessels in the case of the retina, are used for personal biometric identification. In either case, these patterns are generated epigenetically by random events in the morphogenesis of this tissue; this means that they will be distinct for even genetically identical (monozygotic) twins.

A conventional iris code is a bit string extracted from an image of the iris. To compute the iris code, an eye image is segmented to separate the iris form the pupil and sclera, the segmented eye image is mapped into polar or pseudo-polar coordinates, and phase information is extracted using complex-valued two-dimensional wavelets (e.g., Gabor or Haar). A typical iris code is a bit string based on the signs of the wavelet convolutions and has 2048 bits. The iris code may be accompanied by a mask with an equal number of bits that signify whether an analyzed region was occluded by eyelids, eyelashes, specular reflections, or corrupted by noise. Use of such an iris code is the standard for many common iris-based biometric tasks such as identification of passengers from passport data.

SUMMARY

The process of segmenting an eye image to separate the iris from the pupil and sclera has many challenges.

In one aspect, a method for eye image segmentation and image quality estimation is disclosed. The method is under control of a hardware processor and comprises: receiving an eye image; processing the eye image using a convolution neural network to generate a segmentation of the eye image; and processing the eye image using the convolution neural network to generate a quality estimation of the eye image, wherein the convolution neural network comprises a segmentation tower and a quality estimation tower, wherein the segmentation tower comprises segmentation layers and shared layers, wherein the quality estimation tower comprises quality estimation layers and the shared layers, wherein a first output layer of the shared layers is connected to a first input layer of the segmentation tower and a second input layer of the segmentation tower, wherein the first output layer of the shared layers is connected to an input layer of the quality estimation layer, and wherein receiving the eye image comprises receiving the eye image by an input layer of the shared layers.

In another aspect, a method for eye image segmentation and image quality estimation is disclosed. The method is under control of a hardware processor and comprises: receiving an eye image; processing the eye image using a convolution neural network to generate a segmentation of the eye image; and processing the eye image using the convolution neural network to generate a quality estimation of the eye image.

In yet another aspect, a method for training a convolution neural network for eye image segmentation and image quality estimation is disclosed. The method is under control of a hardware processor and comprises: obtaining a training set of eye images; providing a convolutional neural network with the training set of eye images; and training the convolutional neural network with the training set of eye images, wherein the convolution neural network comprises a segmentation tower and a quality estimation tower, wherein the segmentation tower comprises segmentation layers and shared layers, wherein the quality estimation tower comprises quality estimation layers and the shared layers, wherein an output layer of the shared layers is connected to a first input layer of the segmentation tower and a second input layer of the segmentation tower, and wherein the output layer of the shared layers is connected to an input layer of the quality estimation layer.

In a further aspect, a method for determining eye contours in a semantically segmented eye image is disclosed. The method is under control of a hardware processor and comprises: receiving a semantically segmented eye image of an eye image comprising a plurality of pixels, wherein a pixel of the semantically segmented eye image has a color value, wherein the color value of the pixel of the semantically segmented eye image is a first color value, a second color value, a third color value, and a fourth color value, wherein the first color value corresponds to a background of the eye image, wherein the second color value corresponds to a sclera of the eye in the eye image, wherein the third color value corresponds to an iris of the eye in the eye image, and wherein the fourth color value corresponds to a pupil of the eye in the eye image; determining a pupil contour using the semantically segmented eye image; determining an iris contour using the semantically segmented eye image; and determining a mask for an irrelevant area in the semantically segmented eye image.

In another aspect, a method for determining eye contours in a semantically segmented eye image is disclosed. The method is under control of a hardware processor and comprises: receiving a semantically segmented eye image of an eye image; determining a pupil contour of an eye in the eye image using the semantically segmented eye image; determining an iris contour of the eye in the eye image using the semantically segmented eye image; and determining a mask for an irrelevant area in the eye image.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 10A-10C schematically illustrate an example pupil contour determination.

Figure 1:
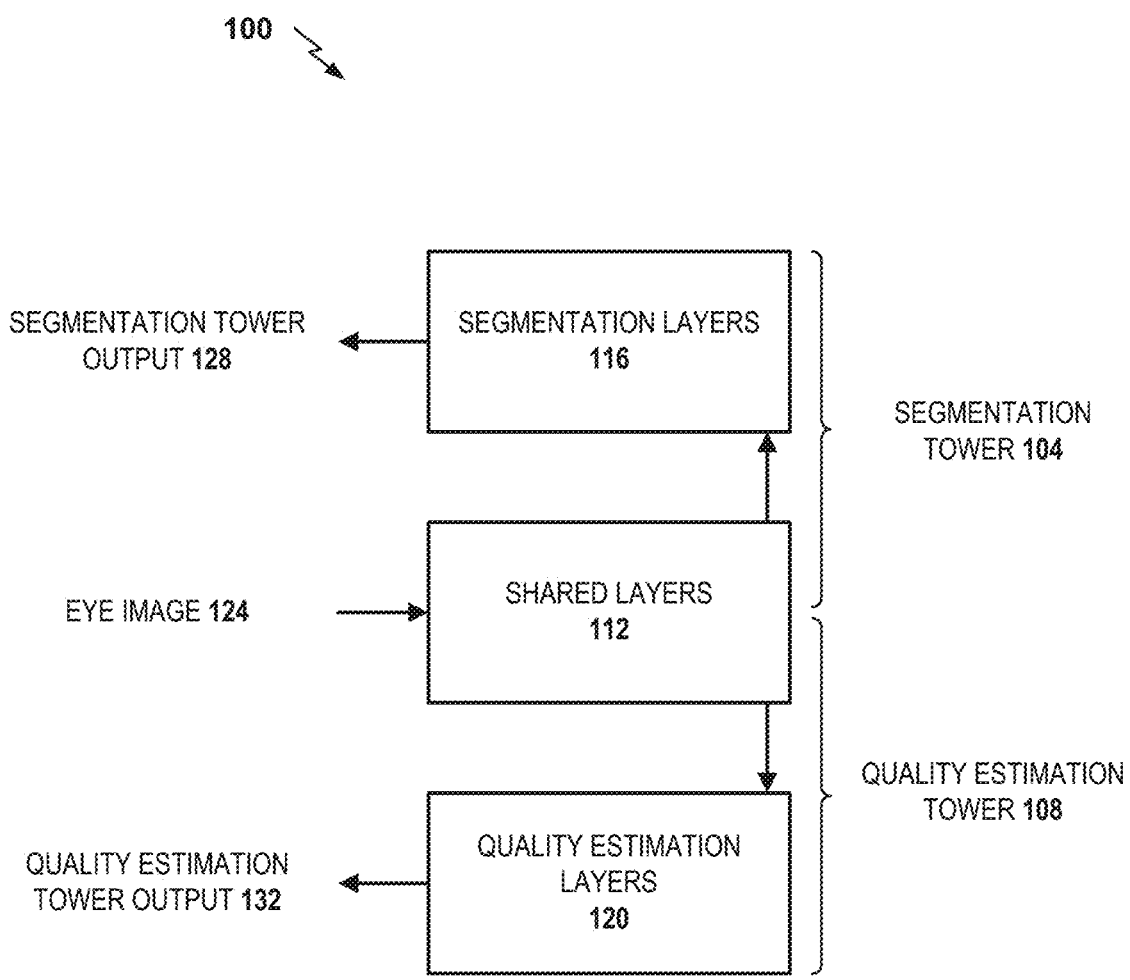
FIG. 1 is a block diagram of an example convolutional neural network with a merged architecture that includes a segmentation tower and a quality estimation tower sharing shared layers.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A conventional wavelet-based iris code with 2048 bits can be used for iris identification. However, the iris code can be sensitive to variations including image cropping, image blurring, lighting conditions while capturing images, occlusion by eyelids and eyelashes, and image angle of view. Additionally, prior to computing the iris code, an eye image needs to be segmented to separate the iris region from the pupil region and the surrounding sclera region.

A convolutional neural network (CNN) may be used for segmenting eye images. Eye images can include the periocular region of the eye, which includes the eye and portions around the eye such as eyelids, eyebrows, eyelashes, and skin surrounding the eye. An eye image can be segmented to generate the pupil region, iris region, or sclera region of an eye in the eye image. An eye image can also be segmented to generate the background of the eye image, including skin such as an eyelid around an eye in the eye image. The segmented eye image can be used to compute an iris code, which can in turn be used for iris identification. To generate an eye image segmentation useful or suitable for iris identification, quality of the eye image or segmented eye image may be determined or estimated. With the quality of the eye image or segmented eye image determined, eye images that may not be useful or suitable for iris identification can be determined and filtered out from subsequent iris identification. For example, eye images which capture blinking eyes, blurred eye images, or improperly segmented eye images may not be useful or suitable for iris identification. By filtering out poor quality eye images or segmented eye images, iris identification can be improved. One possible cause of generating improperly segmented eye images is having an insufficient number of eye images that are similar to the improperly segmented eye images when training the convolutional neural network to segment eye images.

Systems and methods disclosed herein address various challenges related to eye image segmentation and image quality estimation. For example, a convolutional neural network such as a deep neural network (DNN) can be used to perform both eye image segmentation and image quality estimation. A CNN for performing both eye image segmentation and image quality estimation can have a merged architecture. A CNN with a merged architecture can include a segmentation tower, which segments eye images, and a quality estimation tower, which determines quality estimations of eye images so poor quality eye images can be filtered out. The segmentation tower can include segmentation layers connected to shared layers. The segmentation layers can be CNN layers unique to the segmentation tower and not shared with the quality estimation tower. The quality estimation tower can include quality estimation layers connected to the shared layers. The quality estimation layers can be CNN layers unique to the quality estimation tower and not shared with the segmentation tower. The shared layers can be CNN layers that are shared by the segmentation tower and the quality estimation tower.

The segmentation tower can segment eye images to generate segmentations of the eye images. The shared layers of the segmentation tower (or the quality estimation tower) can receive as its input an eye image, for example a 120×160 grayscale image. The segmentation tower can generate segmentation tower output. The segmentation tower output can include multiple images, e.g., four images, one for each of the pupil region, iris region, sclera region, or background region of the eye image. The quality estimation tower can generate quality estimations of the eye images or segmented eye images.

When training the convolutional neural network with the merged architecture, many kernels can be learned. A kernel, when applied to its input, produces a resulting feature map showing the response to that particular learned kernel. The resulting feature map can then be processed by a kernel of another layer of the CNN which down samples the resulting feature map through a pooling operation to generate a smaller feature map. The process can then be repeated to learn new kernels for computing their resulting feature maps.

The segmentation tower (or the quality estimation tower) in the merged CNN architecture can implement an encoding-decoding architecture. The early layers of the segmentation tower (or the quality estimation tower) such as the shared layers can encode the eye image by gradually decreasing spatial dimension of feature maps and increasing the number of feature maps computed by the layers. Some layers of the segmentation tower (or the quality estimation tower) such as the last layers of the segmentation layers (or the quality estimation layers) can decode the encoded eye image by gradually increasing spatial dimension of feature maps back to the original eye image size and decreasing the number of feature maps computed by the layers.

A possible advantage of the merged CNN architecture including both a segmentation tower and a quality estimation tower is that during training, the shared layers of the CNN find feature maps that are useful for both segmentation and image quality. Accordingly, such a CNN can be beneficial compared to use of separate CNNs, one for segmentation and another one for quality estimation, in which the feature maps for each separate CNN may have little or no relationship.

Example Convolutional Neural Network

FIG. 1 is a block diagram of an example convolutional neural network 100 with a merged architecture that includes a segmentation tower 104 and a quality estimation tower 108 sharing shared layers 112. The convolutional neural network 100 such as a deep neural network (DNN) can be used to perform both eye image segmentation and image quality estimation. A CNN 100 with a merged architecture can include a segmentation tower 104 and a quality estimation tower 108. The segmentation tower 104 can include segmentation layers 116 connected to the shared layers 112. The shared layers 112 can be CNN layers that are shared by the segmentation tower 104 and the quality estimation tower 108. An output layer of the shared layers 112 can be connected to an input layer of the segmentation layers 116. One or more output layers of the shared layers 112 can be connected to one or more input layers of the segmentation layers 116. The segmentation layers 116 can be CNN layers unique to the segmentation tower 104 and not shared with the quality estimation tower 108.

The quality estimation tower 108 can include quality estimation layers 120 and the shared layers 112. The quality estimation layers 120 can be CNN layers unique to the quality estimation tower 108 and not shared with the segmentation tower 104. An output layer of the shared layers 112 can be a shared layer 112 that is connected to an input layer of the quality estimation layers 120. An input layer of the quality estimation layers 120 can be connected to an output layer of the shared layers 112. One or more output layers of the shared layers 112 can be connected to one or more input layers of the quality estimation layers 120.

The shared layers 112 can be connected to the segmentation layers 116 or the quality estimation layers 120 differently in different implementations. For example, an output layer of the shared layers 112 can be connected to one or more input layers of the segmentation layers 116 or one or more input layers of the quality estimation layers 120. As another example, an output layer of the shared layers 112 can be connected to one or more input layers of the segmentation layers 116 and one or more input layers of the quality estimation layers 120. Different numbers of output layers of the shared layers 112, such as 1, 2, 3, or more output layers, can be connected to the input layers of the segmentation layers 116 or the quality estimation layers 120. Different numbers of input layers of the segmentation layers 116 or the quality estimation layers 120, such as 1, 2, 3, or more input layers, can be connected to the output layers of the shared layers 112.

Figure 2:
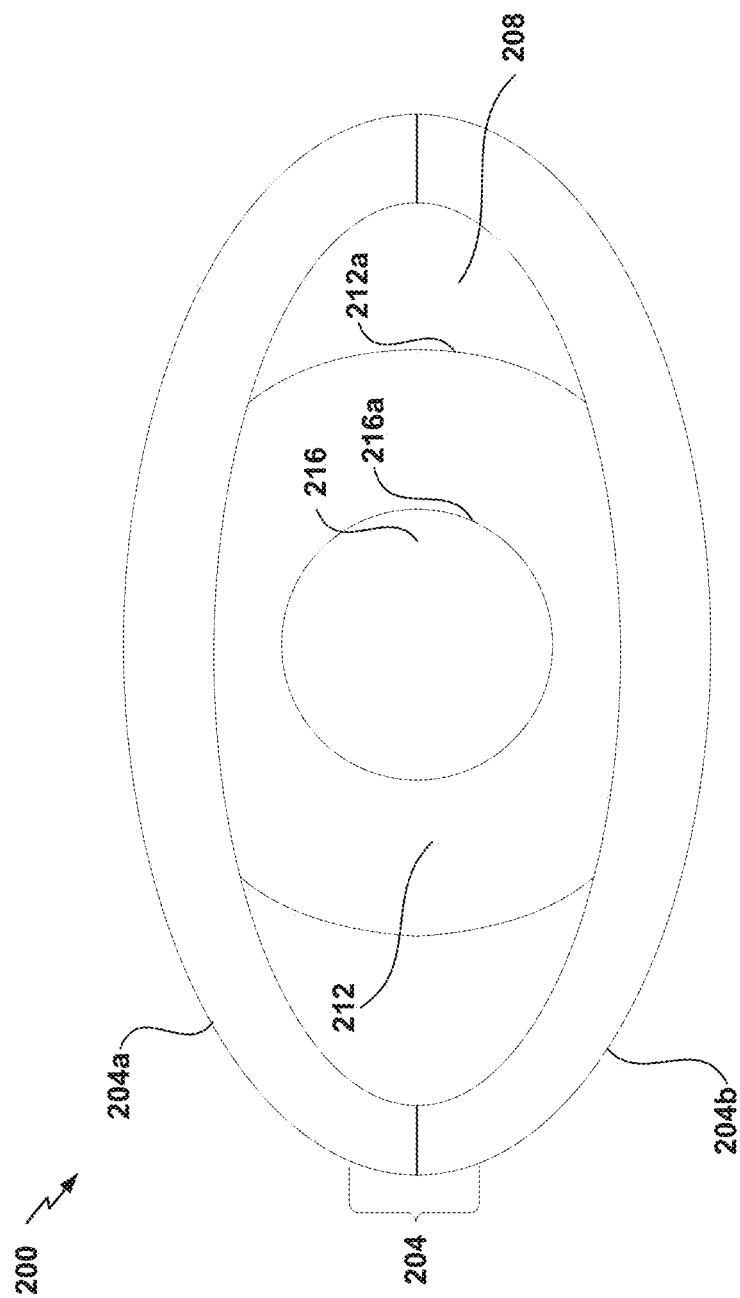
FIG. 2 schematically illustrates an example eye in an eye image.

The segmentation tower 104 can process an eye image 124 to generate segmentations of the eye image. FIG. 2 schematically illustrates an example eye 200 in an eye image 124. The eye 200 includes eyelids 204, a sclera 208, an iris 212, and a pupil 216. A curve 216a shows the pupillary boundary between the pupil 216 and the iris 212, and a curve 212a shows the limbic boundary between the iris 212 and the sclera 208 (the "white" of the eye). The eyelids 204 include an upper eyelid 204a and a lower eyelid 204b.

With reference to FIG. 1, an input layer of the shared layers 112 of the segmentation tower 104 (or the quality estimation tower 108) can receive as its input an eye image 124, for example a 120×160 grayscale image. The segmentation tower 104 can generate segmentation tower output 128. The segmentation tower output 128 can include multiple images, e.g., four images, one for each region corresponding to the pupil 216, the iris 212, the sclera 208, or the background in the eye image 124. The background of the eye image can include regions that correspond to eyelids, eyebrows, eyelashes, or skin surrounding an eye in the eye image 124. In some implementations, the segmentation tower output 128 can include a segmented eye image. A segmented eye image can include segmented pupil, iris, sclera, or background.

The quality estimation tower 108 can process an eye image 124 to generate quality estimation tower output such as a quality estimation of the eye image 124. A quality estimation of the eye image 124 can be a binary classification: a good quality estimation classification or a bad quality estimation classification. A quality estimation of the eye image 124 can comprise a probability of the eye image 124 having a good quality estimation classification. If the probability of the eye image 124 being good exceeds a high quality threshold (such as 75%, 85%, 95%), the image can be classified as being good. Conversely, in some embodiments, if the probability is below a low quality threshold (such as 25%, 15%, 5%), then the eye image 124 can be classified as being poor.

When training the convolutional neural network 100, many kernels are learned. A kernel, when applied to the input eye image 124 or a feature map computed by a previous CNN layer, produces a resulting feature map showing the response of its input to that particular kernel. The resulting feature map can then be processed by a kernel of another layer of the convolutional neural network 100 which down samples the resulting feature map through a pooling operation to generate a smaller feature map. The process can then be repeated to learn new kernels for computing their resulting feature maps. Accordingly, the shared layers can be advantageously trained simultaneously when training the segmentation tower 104 and the quality estimation tower 108.

The segmentation tower 104 (or the quality estimation tower 108) can implement an encoding-decoding architecture. The early layers of the segmentation tower 104 (or the quality estimation tower 108) such as the shared layers 112 can encode an eye image 124 by gradually decreasing spatial dimension of feature maps and increasing the number of feature maps computed by the layers. Decreasing spatial dimension may advantageously result in the feature maps of middle layers of the segmentation tower 104 (or the quality estimation tower 108) global context aware.

However decreasing spatial dimension may result in accuracy degradation, for example, at segmentation boundaries such as the pupillary boundary or the limbic boundary. In some implementations, a layer of the segmentation tower 104 (or the quality estimation tower 108) can concatenate feature maps from different layers such as output layers of the shared layers 104. The resulting concatenated feature maps may advantageously be multi-scale because features extracted at multiple scales can be used to provide both local and global context and the feature maps of the earlier layers can retain more high frequency details leading to sharper segmentation boundaries.

In some implementations, a convolution layer with a kernel size greater than 3 pixels×3 pixels can be replaced with consecutive 3 pixels×3 pixels convolution layers. With consecutive 3 pixels×3 pixels convolution layer, the convolutional neural network 100 can advantageously be smaller or faster.

Some layers of the segmentation tower 104 (or the quality estimation tower 108) such as the last layers of the segmentation layers 116 (or the quality estimation layers 120) can decode the encoded eye image by gradually increasing spatial dimension of feature maps back to the original eye image size and decreasing the number of feature maps. Some layers of the convolutional neural network 100, for example the last two layers of the quality estimation layers 120, can be fully connected.

Example Convolutional Neural Network Layers

The convolutional neural network 100 can include one or more neural network layers. A neural network layer can apply linear or non-linear transformations to its input to generate its output. A neural network layer can be a convolution layer, a normalization layer (e.g., a brightness normalization layer, a batch normalization (BN) layer, a local contrast normalization (LCN) layer, or a local response normalization (LRN) layer), a rectified linear layer, an upsampling layer, a concatenation layer, a pooling layer, a fully connected layer, a linear fully connected layer, a softsign layer, a recurrent layer, or any combination thereof.

A convolution layer can apply a set of kernels that convolve or apply convolutions to its input to generate its output. The normalization layer can be a brightness normalization layer that normalizes the brightness of its input to generate its output with, for example, L2 normalization. A normalization layer can be a batch normalization (BN) layer that can normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have mean of zero and variance of one. Local response normalization can normalize an image over local input regions to have mean of zero and variance of one. The normalization layer may speed up the computation of the eye segmentations and quality estimations.

A rectified linear layer can be a rectified linear layer unit (ReLU) layer or a parameterized rectified linear layer unit (PReLU) layer. The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number.

An upsampling layer can upsample its input to generate its output. For example, the upsampling layer can upsample a 4 pixels×5 pixels input to generate a 8 pixels×10 pixels output using upsampling methods such as the nearest neighbor method or the bicubic interpolation method. The concatenation layer can concatenate its input to generate its output. For example, the concatenation layer can concatenate four 5 pixels×5 pixels feature maps to generate one 20 pixels×20 pixels feature map. As another example, the concatenation layer can concatenate four 5 pixels×5 pixels feature maps and four 5 pixels×5 pixels feature maps to generate eight 5 pixels×5 pixels feature maps. The pooling layer can apply a pooling function which down samples its input to generate its output. For example, the pooling layer can down sample a 20 pixels×20 pixels image into a 10 pixels×10 pixels image. Non-limiting examples of the pooling function include maximum pooling, average pooling, or minimum pooling.

A node in a fully connected layer is connected to all nodes in the previous layer. A linear fully connected layer, similar to a linear classifier, can be a fully connected layer with two output values such as good quality or bad quality. The softsign layer can apply a softsign function to its input. The softsign function (softsign(x)) can be, for example, $(x/(1+|x|))$. The softsign layer may neglect impact of per-element outliers. A per-element outlier may occur because of eyelid occlusion or accidental bright spot in the eye images.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as an input the hidden state s(t) of the recurrent layer at time t. The recurrent layer can compute the hidden state s(t+1) by applying, for example, a ReLU function to its input.

The number of the neural network layers in the convolutional neural network 100 can be different in different implementations. For example, the number of the neural network layers in the convolutional neural network 100 can be 100. The input type of a neural network layer can be different in different implementations. For example, a neural network layer can receive the output of a neural network layer as its input. The input of a neural network layer can be different in different implementations. For example, the input of a neural network layer can include the output of a neural network layer.

The input size or the output size of a neural network layer can be quite large. The input size or the output size of a neural network layer can be n×m, where n denotes the height in pixels and m denotes the width in pixels of the input or the output. For example, n×m can be 120 pixels×160 pixels. The channel size of the input or the output of a neural network layer can be different in different implementations. For example, the channel size of the input or the output of a neural network layer can be eight. Thus, the a neural network layer can receive eight channels or feature maps as its input or generate eight channels or feature maps as its output. The kernel size of a neural network layer can be different in different implementations. The kernel size can be n×m, where n denotes the height in pixels and m denotes the width in pixels of the kernel. For example, n or m can be 3 pixels. The stride size of a neural network layer can be different in different implementations. For example, the stride size of a neural network layer can be three. A neural network layer can apply a padding to its input, for example a n×m padding, where n denotes the height and m denotes the width of the padding. For example, n or m can be one pixel.

Example Shared Layers

Figure 3A:
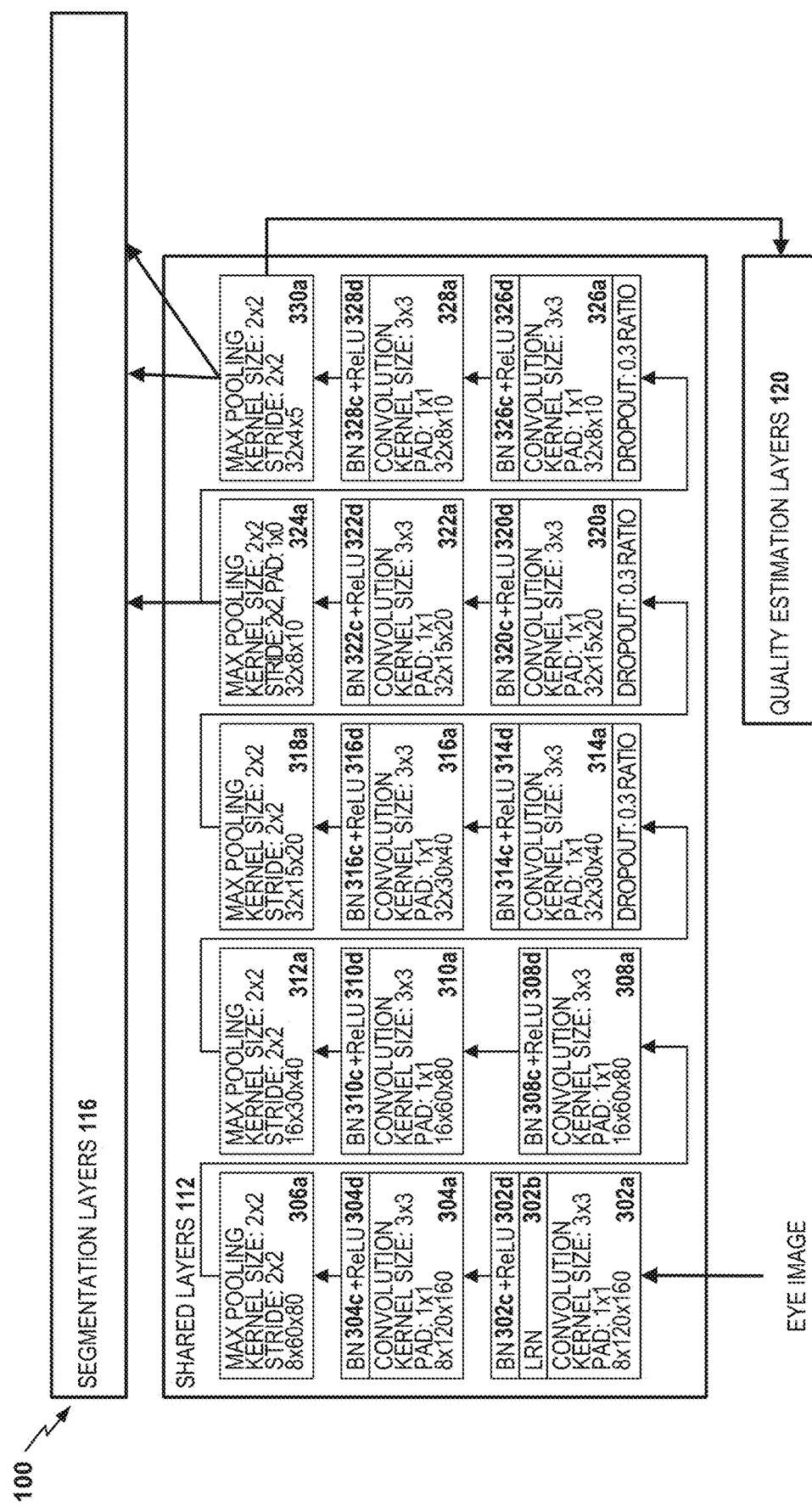
FIGS. 3A-3C depict an example convolutional neural network with a merged architecture.
Figure 3B:
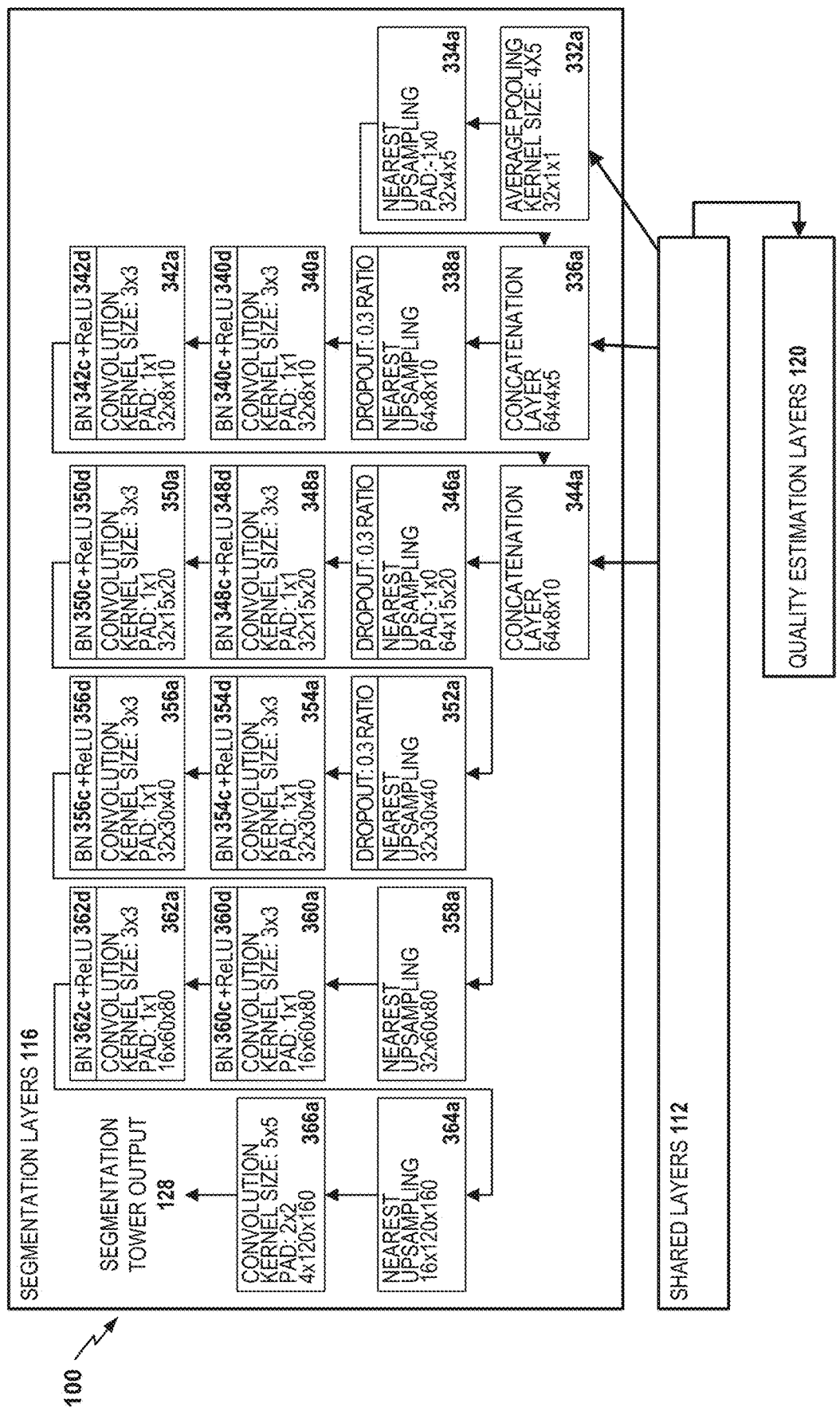
Figure 3C:
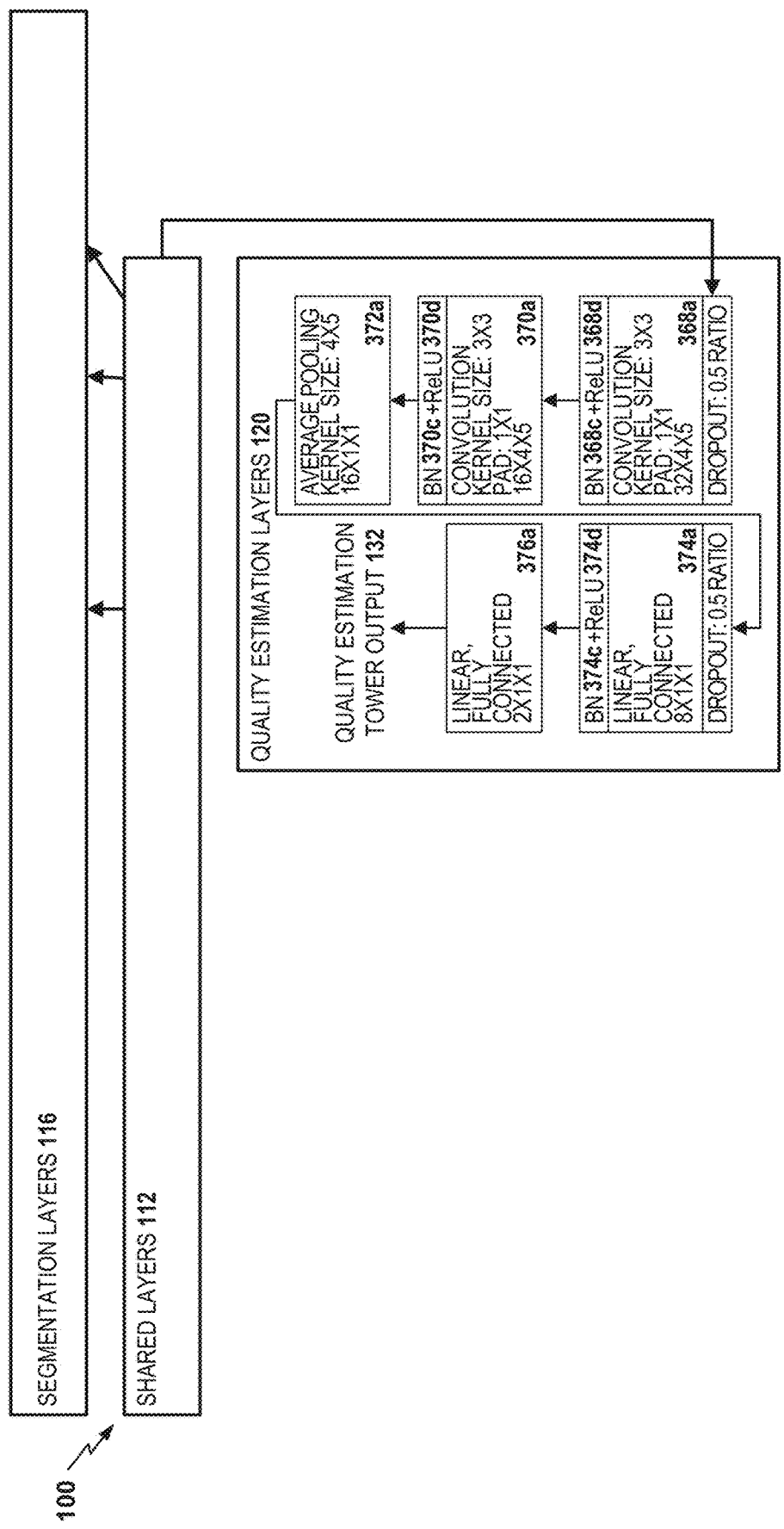

FIGS. 3A-3C depict an example convolutional neural network 100 with a merged architecture. FIG. 3A depicts an example architecture of the shared layers 112 of the segmentation tower 104 of the convolutional neural network 100. An input layer of the shared layers 112 can be a convolution layer 302a that convolves an input eye image 124 (a 120×160 grayscale image) with 3×3 kernels (3 pixels×3 pixels) after adding a 1×1 padding (1 pixel×1 pixel). After adding a padding and convolving its input, the convolution layer 302a generates 8 channels of output with each channel being a 120×160 feature map, denoted as 8×120×160 in the block representing the convolution layer 302a. The 8 channels of output can be processed by a local response normalization (LRN) layer 302b, a batch normalization (BN) layer 302c, and a rectified linear layer unit (ReLU) layer 302d.

The ReLU layer 302d can be connected to a convolution layer 304a that convolves the output of the ReLU layer 302d with 3×3 kernels after adding a 1×1 padding to generate eight channels of output (120×160 feature maps). The eight channels of output can be processed by a batch normalization layer 304c and a ReLU layer 304d. The ReLU layer 304d can be connected to a maximum pooling (MAX POOLING) layer 306a that pools the output of the ReLU layer 304d with 2×2 kernels using 2×2 stride (2 pixels×2 pixels) to generate 8 channels of output (60×80 feature maps).

The maximum pooling layer 306a can be connected to a convolution layer 308a that convolves the output of the maximum pooling layer 306a with 3×3 kernels after adding a 1×1 padding to generate 16 channels of output (60×80 feature maps). The 16 channels of output can be processed by a batch normalization layer 308c and a ReLU layer 308d.

The ReLU layer 308d can be connected to a convolution layer 310a that convolves the output of the ReLU layer 308d with 3×3 kernels after adding a 1×1 padding to generate 16 channels of output (60×80 feature maps). The 16 channels of output can be processed by a batch normalization layer 310c and a ReLU layer 310d. The ReLU layer 310d can be connected to a maximum pooling layer 312a that pools the output of the ReLU layer 310d with 2×2 kernels using 2×2 stride to generate 16 channels of output (30×40 feature maps).

The maximum pooling layer 312a can be connected to a convolution layer 314a that convolves the output of the maximum pooling layer 312a with 3×3 kernels after adding a 1×1 padding to generate 32 channels of output (30×40 feature maps). During a training cycle when training the convolutional neural network 100, 30% of weight values of the convolution layer 314a can be randomly set to values of zero, for a dropout ratio of 0.3. The 32 channels of output can be processed by a batch normalization layer 314c and a ReLU layer 314d.

The ReLU layer 314d can be connected to a convolution layer 316a that convolves the output of the ReLU layer 314d with 3×3 kernels after adding a 1×1 padding to generate 32 channels of output (30×40 feature maps). The 32 channels of output can be processed by a batch normalization layer 316c and a ReLU layer 316d. The ReLU layer 316d can be connected to a maximum pooling layer 318a that pools the output of the ReLU layer 316d with 2×2 kernels using 2×2 stride to generate 32 channels of output (15×20 feature maps).

The maximum pooling layer 318a can be connected to a convolution layer 320a that convolves the output of the maximum pooling layer 318a with 3×3 kernels after adding a 1×1 padding to generate 32 channels of output (15×20 feature maps). During a training cycle when training the convolutional neural network 100, 30% of weight values of the convolution layer 320a can be randomly set to values of zero, for a dropout ratio of 0.3. The 32 channels of output can be processed by a batch normalization layer 320c and a ReLU layer 320d.

The ReLU layer 320d can be connected to a convolution layer 322a that convolves the output of the ReLU layer 320d with 3×3 kernels after adding a 1×1 padding to generate 32 channels of output (15×20 feature maps). The 32 channels of output can be processed by a batch normalization layer 322c and a ReLU layer 322d. The ReLU layer 322d can be connected to a maximum pooling layer 324a that pools the output of the ReLU layer 322d with 2×2 kernels using 2×2 stride after adding a 1×0 padding to generate 32 channels of output (8×10 feature maps). The maximum pooling layer 324a can be connected to an input layer of the segmentation layers 116.

The maximum pooling layer 324a can be connected to a convolution layer 326a that convolves the output of the maximum pooling layer 324a with 3×3 kernels after adding a 1×1 padding to generate 32 channels of output (8×10 feature maps). During a training cycle when training the convolutional neural network 100, 30% of weight values of the convolution layer 326a can be randomly set to values of zero, for a dropout ratio of 0.3. The 32 channels of output can be processed by a batch normalization layer 326c and a ReLU layer 326d. The maximum pooling layer 324a can be connected to the segmentation layers 116.

The ReLU layer 326d can be connected to a convolution layer 328a that convolves the output of the ReLU layer 326d with 3×3 kernels after adding a 1×1 padding to generate 32 channels of output (8×10 feature maps). The 32 channels of output can be processed by a batch normalization layer 328c and a ReLU layer 328d. The ReLU layer 328d can be connected to a maximum pooling layer 330a that pools the output of the ReLU layer 328d with 2×2 kernels using 2×2 stride to generate 32 channels of output (4×5 feature maps). The maximum pooling layer 330a can be connected to the segmentation layers 116 and the quality estimation layers 120.

The example shared layers 112 in FIG. 3A implements an encoding architecture. The example shared layers 112 encodes an eye image 124 by gradually decreasing spatial dimension of feature maps and increasing the number of feature maps computed by the layers. For example, the convolution layer 302a generates 8 channels of output with each channel being a 120×160 feature map while the convolution layer 326a generates 32 channels of output with each channel being a 8×10 feature map.

Example Segmentation Layers

FIG. 3B depicts an example architecture of the segmentation layers 116 of the segmentation tower 104 of the convolutional neural network 100. An input layer of the segmentation layers 116 can be an average pooling layer 332a that is connected to the maximum pooling layer 330a of the shared layers 112. The average pooling layer 332a can pool the output of the maximum pooling layer 330a with 4×5 kernels (4 pixels×5 pixels) to generate 32 channels of output (1×1 feature maps, i.e. feature maps each with a dimension of 1 pixel×1 pixel). The average pooling layer 332a can be connected to an upsampling layer 334a that uses the nearest neighbor method with a−1×0 padding (−1 pixel×0 pixel) to generate 32 channels of output (4×5 feature maps).

A concatenation layer 336a can be an input layer of the segmentation layers 116 that is connected to the maximum pooling layer 330a of the shared layers 112. The concatenation layer 336a can also be connected to the upsampling layer 334a. After concatenating its input received from the maximum pooling layer 330a and the upsampling layer 334a, the concatenation layer 336a can generate 64 channels of output (4×5 feature maps). By concatenating the outputs from two layers, features extracted at multiple scales can be used to provide both local and global context and the feature maps of the earlier layers can retain more high frequency details leading to sharper segmentation boundaries. Thus, the resulting concatenated feature maps generated by the concatenation layer 336a may advantageously be multi-scale. The concatenation layer 336a can be connected to an upsampling layer 338a that uses the nearest neighbor method to generate 64 channels of output (8×10 feature maps). During a training cycle when training the convolutional neural network 100, 30% of weight values of the upsampling layer 338a can be randomly set to values of zero, for a dropout ratio of 0.3.

The upsampling layer 338a can be connected to a convolution layer 340a that convolves the output of the upsampling layer 338a with 3×3 kernels after adding a 1×1 padding to generate 32 channels of output (8×10 feature maps). The 32 channels of output can be processed by a batch normalization layer 340c and a ReLU layer 340d. The ReLU layer 340d can be connected to a convolution layer 342a that convolves the output of the ReLU layer 340d with 3×3 kernels after adding a 1×1 padding to generate 32 channels of output (8×10 feature maps). The 32 channels of output can be processed by a batch normalization layer 342c and a ReLU layer 342d.

A concatenation layer 344a can be an input layer of the segmentation layers 116 that is connected to the maximum pooling layer 324a of the shared layers 112. The concatenation layer 344a can also be connected to the ReLU layer 342a. After concatenating its input received from the ReLU layer 342a and the maximum pooling layer 324a, the concatenation layer 344a generates 64 channels of output (64 8×10 feature maps). The concatenation layer 344a can be connected to an upsampling layer 346a that uses the nearest neighbor method to generate 64 channels of output (15×20 feature maps). During a training cycle when training the convolutional neural network 100, 30% of weight values of the upsampling layer 346a can be randomly set to values of zero, for a dropout ratio of 0.3.

The upsampling layer 346a can be connected to a convolution layer 348a that convolves the output of the upsampling layer 346a with 3×3 kernels after adding a 1×1 padding to generate 32 channels of output (15×20 feature maps). The 32 channels of output can be processed by a batch normalization layer 348c and a ReLU layer 348d. The ReLU layer 348d can be connected to a convolution layer 350a that convolves the output of the ReLU layer 348d with 3×3 kernels after adding a 1×1 padding to generate 32 channels of output (15×20 feature maps). The 32 channels of output can be processed by a batch normalization layer 350c and a ReLU layer 350d.

The ReLU layer 350d can be connected to an upsampling layer 352a that uses the nearest neighbor method to generate 32 channels of output (30×40 feature maps). During a training cycle when training the convolutional neural network 100, 30% of weight values of the upsampling layer 352a can be randomly set to values of zero, for a dropout ratio of 0.3.

The upsampling layer 352a can be connected to a convolution layer 354a that convolves the output of the upsampling layer 352a with 3×3 kernels after adding a 1×1 padding to generate 32 channels of output (30×40 feature maps). The 32 channels of output can be processed by a batch normalization layer 354c and a ReLU layer 354d. The ReLU layer 354d can be connected to a convolution layer 356a that convolves the output of the ReLU layer 354d with 3×3 kernels after adding a 1×1 padding to generate 32 channels of output (30×40 feature maps). The 32 channels of output can be processed by a batch normalization layer 356c and a ReLU layer 356d.

The ReLU layer 356d can be connected to an upsampling layer 358a that uses the nearest neighbor method to generate 32 channels of output (60×80 feature maps). The upsampling layer 358a can be connected to a convolution layer 360a that convolves the output of the upsampling layer 358a with 3×3 kernels after adding a 1×1 padding to generate 16 channels of output (60×80 feature maps). The 16 channels of output can be processed by a batch normalization layer 360c and a ReLU layer 360d. The ReLU layer 360d can be connected to a convolution layer 362a that convolves the output of the ReLU layer 360d with 3×3 kernels after adding a 1×1 padding to generate 16 channels of output (60×80 feature maps). The 16 channels of output can be processed by a batch normalization layer 362c and a ReLU layer 362d.

The ReLU layer 362d can be connected to an upsampling layer 364a that uses the nearest neighbor method to generate 16 channels of output (120 by 160 feature maps). The upsampling layer 364a can be connected to a convolution layer 366a that convolves the output of the upsampling layer 364a with 5×5 kernels after adding a 2×2 padding to generate 4 channels of output (120×160 output images). The convolution layer 366a can be an output layer of the segmentation layers 116. The 4 output images can be the segmentation tower output 128, one for reach region corresponding to the pupil 216, the iris 212, the sclera 208, or the background of the eye image 124. In some implementations, the segmentation tower output 128 can be an image with four color values, one for each region corresponding to the pupil 216, the iris 212, the sclera 208, or the background of the eye image 124.

The example segmentation layers 116 in FIG. 3B implements a decoding architecture. The example segmentation layers 116 decodes the encoded eye image by gradually increasing spatial dimension of feature maps back to the original eye image size and decreasing the number of feature maps. For example, the average pooling layer 332a generates 32 channels of output with each channel being a 1×1 feature map, while the convolution layer 366a generates 4 channels of output with each channel being a 120×160 feature map.

Example Quality Estimation Layers

FIG. 3C depicts an example architecture of the quality estimation layers 120 of the quality estimation tower 108 of the convolutional neural network 100. An input layer of the quality estimation layers 120 can be a convolution layer 368a. The convolution layer 368a can convolve the output of the maximum pooling layer 330a of the shared layers 112 with 3×3 kernels (3 pixels×3 pixels) after adding a 1×1 padding (1 pixel×1 pixel) to generate 32 channels of output (4×5 feature maps, i.e. feature maps with a dimension of 4 pixels×5 pixels). During a training cycle when training the convolutional neural network 100, 50% of weight values of the convolution layer 368a can be randomly set to values of zero, for a dropout ratio of 0.5. The 32 channels of output can be processed by a batch normalization layer 368c and a ReLU layer 368d.

The ReLU layer 368d can be connected to a convolution layer 370a that convolves the output of the ReLU layer 368d with 3×3 kernels after adding a 1×1 padding to generate 16 channels of output (4×5 feature maps). The 16 channels of output can be processed by a batch normalization layer 370c and a ReLU layer 370d. The ReLU layer 370d can be connected to an average pooling layer 372a that can pool the output of the ReLU layer 370d with 4×5 kernels to generate 16 channels of output (1×1 feature maps).

The average pooling layer 370d can be connected to linear, fully connected layer 374a that generates 8 channels of output (1 pixel×1 pixel feature maps). During a training cycle when training the convolutional neural network 100, 50% of weight values of the linear, fully connected layer 374a can be randomly set to values of zero, for a dropout ratio of 0.5. The 8 channels of output can be processed by a batch normalization layer 374c and a ReLU layer 374d. The ReLU layer 374d can be connected to a linear, fully connected layer 376a that generates at least two channels of output (1×1 feature maps). The linear, fully connected layer 376a can be an output layer of the quality estimation layers 120. The at least two channels of output can be the quality estimation tower output 128 with one channel corresponding to the good quality estimation and one channel corresponding to the bad quality estimation.

Example Training of Convolutional Neural Networks

Different convolutional neural networks (CNNs) can be different from one another in two ways. The architecture of the CNNs, for example the number of layers and how the layers are interconnected, can be different. The weights which can affect the strength of effect propagated from one layer to another can be different. The output of a layer can be some nonlinear function of the weighted sum of its inputs. The weights of a CNN can be the weights that appear in these summations, and can be approximately analogous to the synaptic strength of a neural connection in a biological system.

The process of training a CNN 100 is the process of presenting the CNN 100 with a training set of eye images 124. The training set can include both input data and corresponding reference output data. This training set can include both example inputs and corresponding reference outputs. Through the process of training, the weights of the CNN 100 can be incrementally learned such that the output of the network, given a particular input data from the training set, comes to match (as closely as possible) the reference output corresponding to that input data.

Thus, in some implementations, a CNN 100 having a merged architecture is trained, using a training set of eye images 124, to learn segmentations and quality estimations of the eye images 124. During a training cycle, the segmentation tower 104 being trained can process an eye image 124 of the training set to generate a segmentation tower output 128 which can include 4 output images, one for reach region corresponding to the pupil 216, the iris 212, the sclera 208, or the background of the eye image 124. The quality estimation tower 108 being trained can process an eye image 124 of the training set to generate a quality estimation tower output 132 of the eye image 124. A difference between the segmentation tower output 128 of the eye image 124 and a reference segmentation tower output of the eye image 124 can be computed. The reference segmentation tower output of the eye image 124 can include four reference output images, one for reach region corresponding to the pupil 216, the iris 212, the sclera 208, or the background of the eye image 124. A difference between the quality estimation tower output 132 of the eye image 124 and a reference quality estimation tower output of the eye image 124 can be computed.

Parameters of the CNN 100 can be updated based on one or both of the differences. For example, parameters of the segmentation layers 116 of the CNN 100 can be updated based on the difference between the segmentation tower output 128 of the eye image 124 and the reference segmentation tower output of the eye image 124. As another example, parameters of the quality estimation layers 120 of the CNN 100 can be updated based on the difference between the quality estimation tower output 132 of the eye image 124 and the reference quality estimation tower output of the eye image 124. As yet another example, parameters of the shared layers 112 can be updated based on both differences. As a further example, parameters of the segmentation layers 116 of the CNN 100 or parameters of the quality estimation layers 120 of the CNN 100 can be updated based on both differences. The two differences can affect the parameters of the shared layers 112, the segmentation layers 116, or the quality estimation layers 130 differently in different implementations. For example, the difference between the segmentation tower output 128 and the reference segmentation tower output can affect the parameters of the shared layers 112 or the segmentation layers 116 to a greater extent compared to the effect of the difference between the quality estimation tower output 132 and the reference quality estimation tower output.

During a training cycle, a percentage of the parameters of the convolutional neural network 100 can be set to values of zero. The percentage can be, for example, 5%-50%, for a dropout ratio of 0.05-0.50. The parameters of the CNN 100 set to values of zero during a training cycle can be different in different implementations. For example, parameters of the CNN 100 set to values of zero can be randomly selected. As another example, if 30% of the parameters of the CNN 100 are set to values of zero, then approximately 30% of parameters of each layer of the CNN 100 can be randomly set to values of zero.

When training the convolutional neural network 100 with the merged architecture, many kernels are learned. A kernel, when applied to its input, produces a resulting feature map showing the response to that particular learned kernel. The resulting feature map can then be processed by a kernel of another layer of the CNN which samples the resulting feature map through a pooling operation to generate a smaller feature map. The process can then be repeated to learn new kernels for computing their resulting feature maps.

Example Eye Images and Segmented Eye Images

Figure 4:
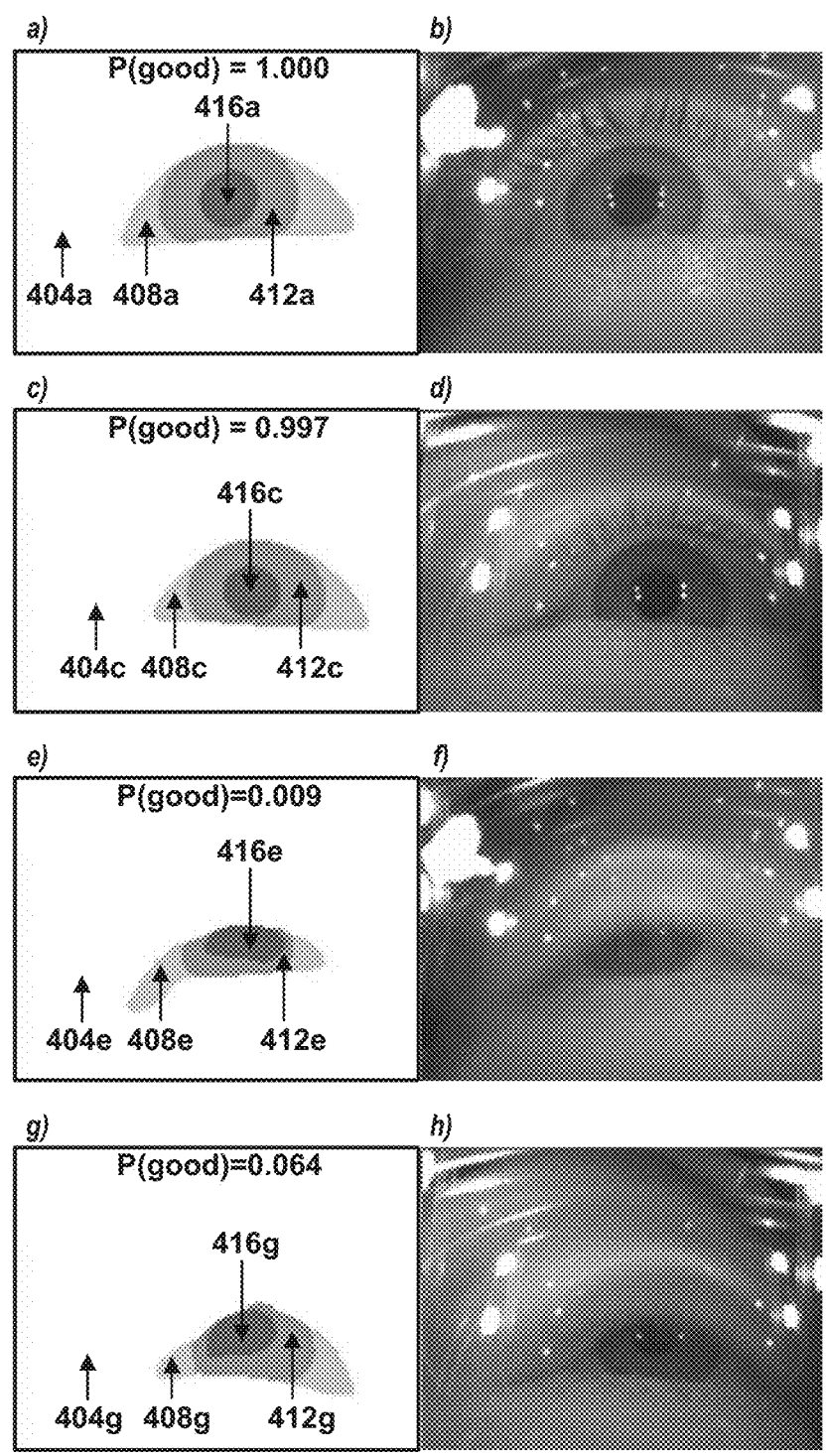
FIG. 4 shows example results of segmenting eye images using a convolutional neural network with the merged convolutional network architecture illustrated in FIG. 3.

FIG. 4 shows example results of segmenting eye images 124 using a convolutional neural network 100 with the merged convolutional network architecture illustrated in FIG. 3. FIG. 4, panel a shows a segmentation of the eye image shown in FIG. 4, panel b. The segmentation of the eye image included a background region 404a, a sclera region 408a, an iris region 412a, or a pupil region 416a of the eye image. The quality estimation of the eye image shown in FIG. 4, panel b was a good quality estimation of 1.000. Accordingly, the quality estimation of the eye image was a good quality estimation.

FIG. 4, panel c shows a segmentation of the eye image shown in FIG. 4, panel d. The segmentation of the eye image included a background region 404c, a sclera region 408c, an iris region 412c, or a pupil region 416c of the eye image. The quality estimation of the eye image shown in FIG. 4, panel d was a good quality estimation of 0.997. Accordingly, the quality estimation of the eye image was a good quality estimation.

FIG. 4, panel e shows a segmentation of the eye image shown in FIG. 4, panel f. A sclera, an iris, and a pupil of an eye in the eye image shown in FIG. 4, panel f were occluded by eyelids of the eye. The segmentation of the eye image included a background region 404e, a sclera region 408e, an iris region 412e, or a pupil region 416e of the eye image. The quality estimation of the eye image shown in FIG. 4, panel f was a good quality estimation of 0.009. Accordingly, the quality estimation of the eye image was a bad quality estimation.

FIG. 4, panel g shows a segmentation of the eye image shown in FIG. 4, panel h. A sclera, an iris, and a pupil of an eye in the eye image shown in FIG. 4, panel h were occluded by eyelids of the eye. Furthermore, the eye image is blurry. The segmentation of the eye image included a background region 404g, a sclera region 408g, an iris region 412g, or a pupil region 416g of the eye image. The quality of the eye image shown in FIG. 4, panel h was a good quality estimation of 0.064. Accordingly, the quality estimation of the eye image was a bad quality estimation.

Example Process for Eye Image Segmentation and Image Quality Estimation

Figure 5:
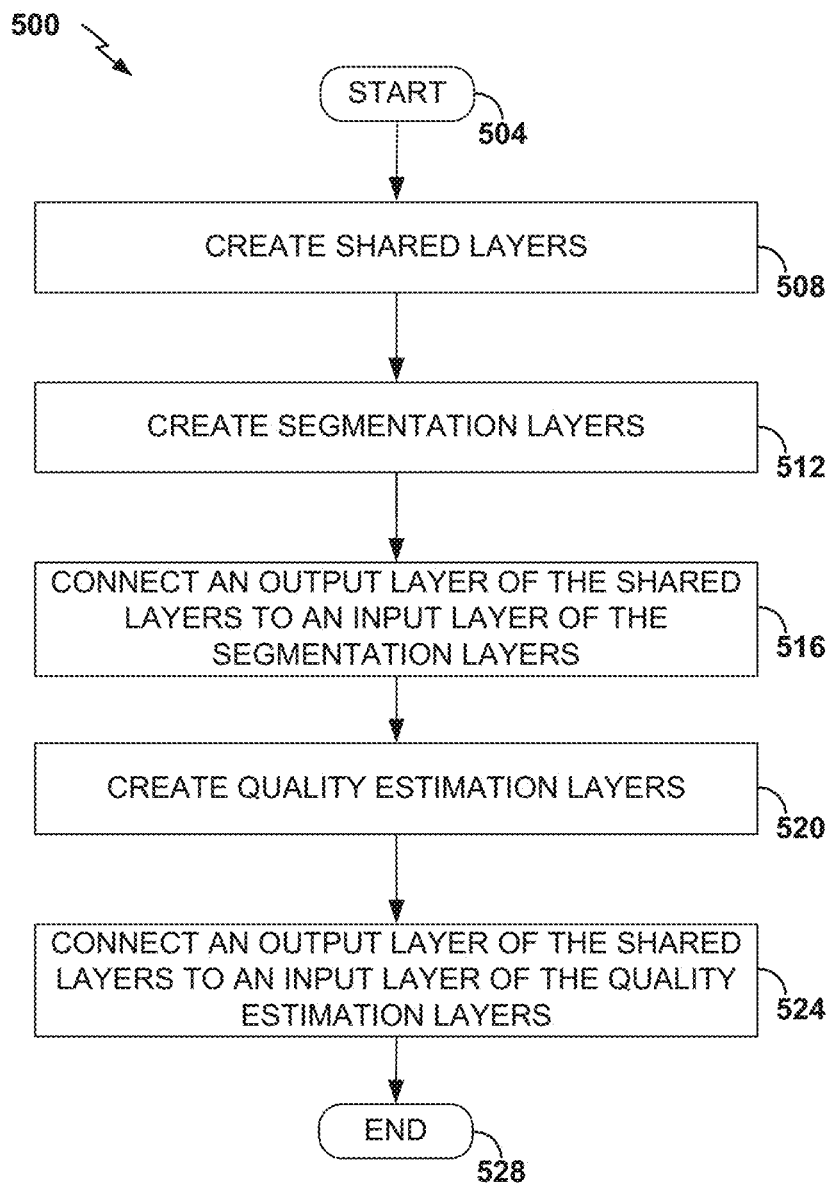
FIG. 5 is a flow diagram of an example process of creating a convolutional neural network with a merged architecture.

FIG. 5 is a flow diagram of an example process 500 of creating a convolutional neural network 100 with a merged architecture. The process 500 starts at block 504. At block 508, shared layers 112 of a convolutional neural network (CNN) 100 are created. The shared layers 112 can include a plurality of layers and a plurality of kernels. Creating the shared layers 112 can include creating the plurality of layers, creating the plurality of kernels with appropriate kernel sizes, strides, or paddings, or connecting the successive layers of the plurality of layers.

At block 512, segmentation layers 116 of the CNN 100 are created. The segmentation layers 116 can include a plurality of layers and a plurality of kernels. Creating the segmentation layers 116 can include creating the plurality of layers, creating the plurality of kernels with appropriate kernel sizes, strides, or paddings, or connecting the successive layers of the plurality of layers. At block 516, an output layer of the shared layers 112 can be connected to an input layer of the segmentation layers 116 to generate a segmentation tower 104 of the CNN 100.

At block 520, quality estimation layers 120 of the CNN 100 are created. The quality estimation layers 120 can include a plurality of layers and a plurality of kernels. Creating the quality estimation layers 120 can include creating the plurality of layers, creating the plurality of kernels with appropriate kernel sizes, strides, or paddings, or connecting the successive layers of the plurality of layers. At block 524, an output layer of the shared layers 112 can be connected to an input layer of the quality estimation layers 120 to generate a quality estimation tower 108 of the CNN 100. The process 500 ends at block 528.

Figure 6:
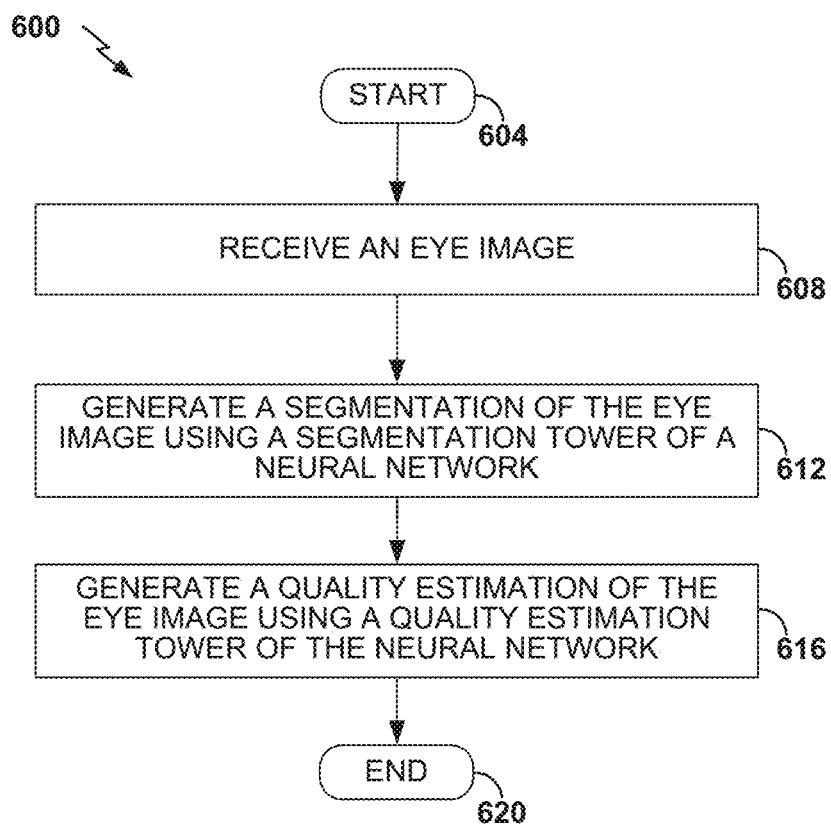
FIG. 6 is a flow diagram of an example process of segmenting an eye image using a convolutional neural network with a merged architecture.

FIG. 6 is a flow diagram of an example process 600 of segmenting an eye image 124 using a convolutional neural network 100 with a merged architecture. The process 600 starts at block 604. At block 608, a neural network receives an eye image 124. For example, an input layer of shared layers 112 of a CNN 100 can receive the eye image 124. An image sensor (e.g., a digital camera) of a user device can capture the eye image 124 of a user, and the neural network can receive the eye image 124 from the image sensor.

After receiving the eye image 124 at block 608, the neural network segments the eye image 124 at block 612. For example, a segmentation tower 104 of the CNN 100 can generate a segmentation of the eye image 124. An output layer of the segmentation tower 104 can, together with other layers of the segmentation tower 104, compute the segmentation of the eye image 124, including a pupil region, an iris region, a sclera region, or a background region of an eye in the eye image 124.

At block 616, the neural network computes a quality estimation of the eye image 124. For example, a quality estimation tower 108 of the CNN 100 can generate the quality estimation of the eye image 124. An output layer of the quality estimation tower 108 can, together with other layers of the quality estimation tower 108, compute the quality estimation of the eye image 124, such as a good quality estimation or a bad quality estimation.

Example Process of Determining a Pupil Contour, an Iris Contour, and a Mask for Irrelevant Image Area A conventional iris code is a bit string extracted from an image of the iris. To compute the iris code, an eye image is segmented to separate the iris form the pupil and sclera, for example, using the convolutional neural network 100 with the merged architecture illustrated in FIG. 1. The segmented eye image can then be mapped into polar or pseudo-polar coordinates before phase information can be extracted using complex-valued two-dimensional wavelets (e.g., Gabor or Haar). One method of creating a polar (or pseudo-polar) image of the iris can include determining a pupil contour, determining an iris contour, and using the determined pupil contour and the determined iris contour to create the polar image.

Figure 7:
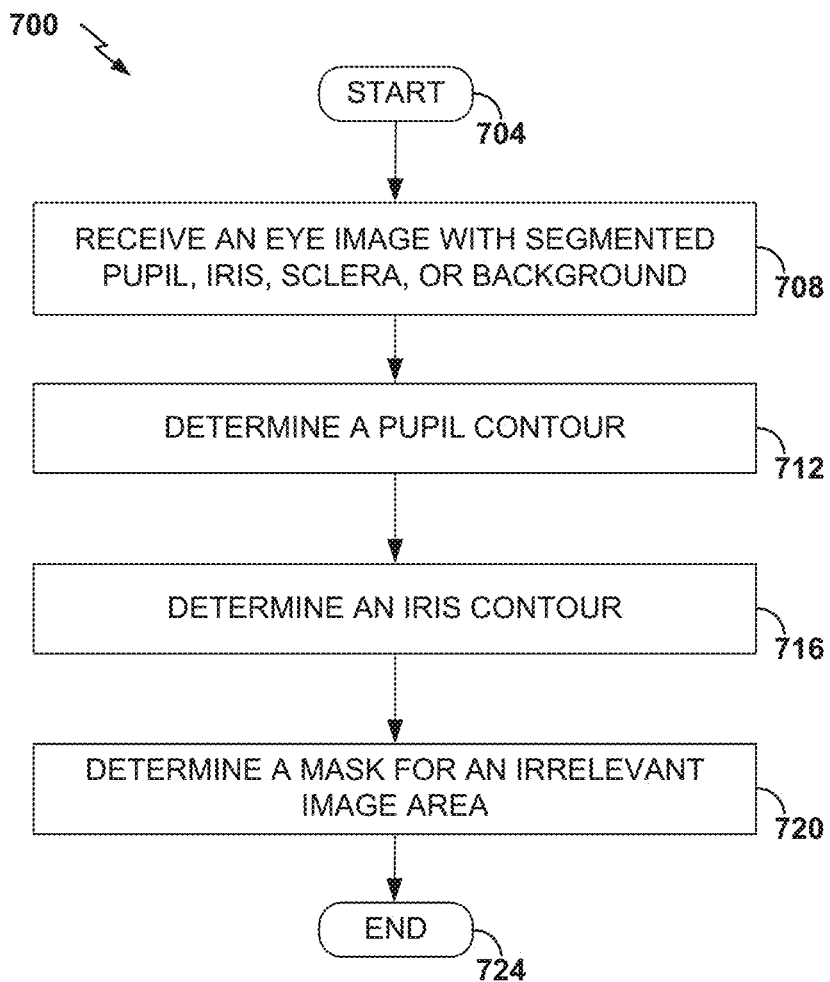
FIG. 7 is a flow diagram of an example process of determining a pupil contour, an iris contour, and a mask for irrelevant image area in a segmented eye image.

FIG. 7 is a flow diagram of an example process 700 of determining a pupil contour, an iris contour, and a mask for irrelevant image area in a segmented eye image. The process 700 starts at block 704. At block 708, a segmented eye image is received. The segmented eye image can include segmented pupil, iris, sclera, or background. A user device can capture an eye image 124 of a user and compute the segmented eye image. A user device can implement the example convolutional neural network (CNN) 100 with the merged architecture illustrated in FIGS. 3A-3C or the example process 600 illustrated in FIG. 6 to compute the segmented eye image.

Figure 8:
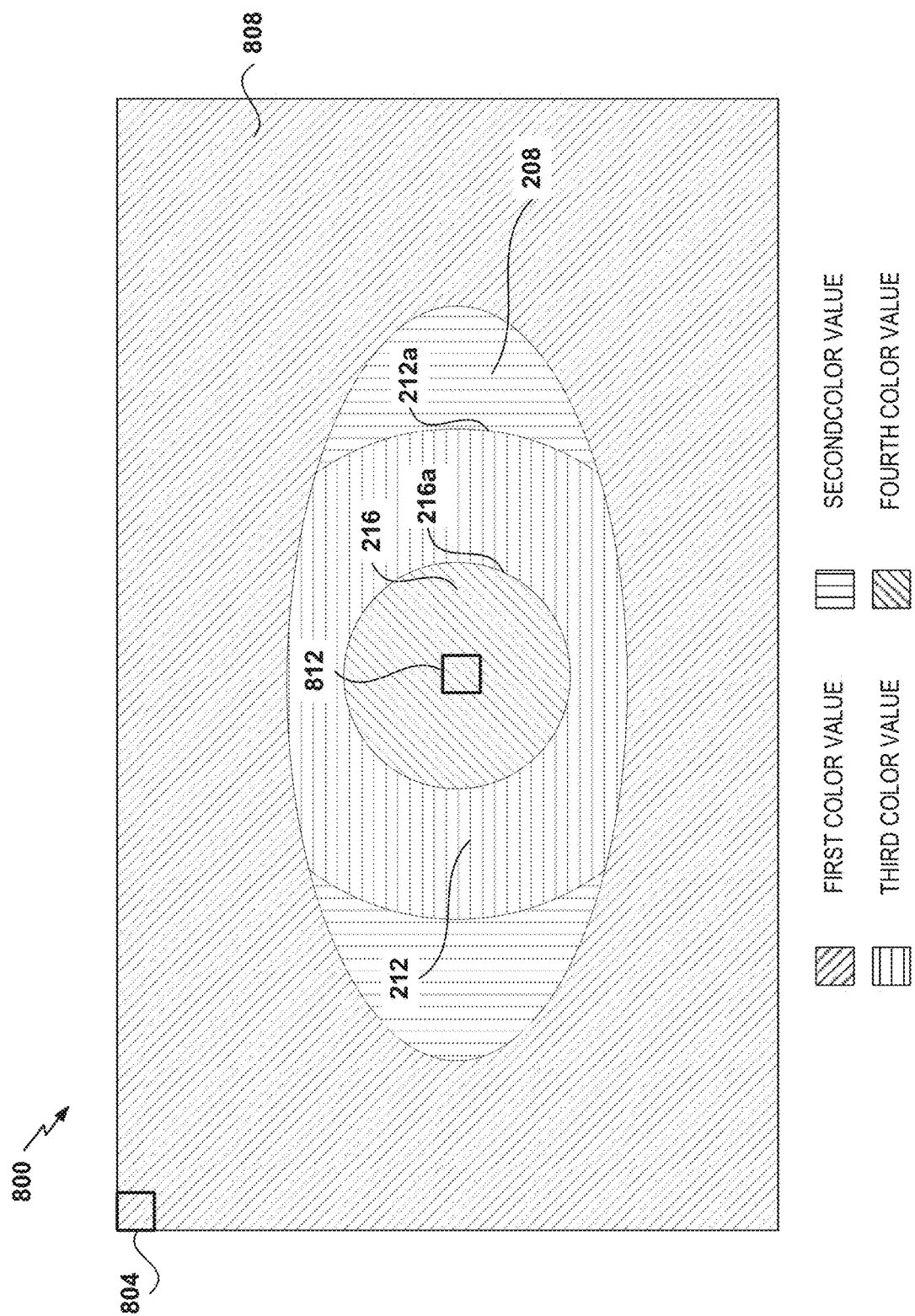
FIG. 8 schematically illustrates an example semantically segmented eye image.

The segmented eye image can be a semantically segmented eye image. FIG. 8 schematically illustrates an example semantically segmented eye image 800. The semantically segmented eye image 800 can be computed from an image of the eye 200 illustrated in FIG. 2. The semantically segmented eye image 800 can have a dimension of n pixels×m pixels, where n denotes the height in pixels and m denotes the width in pixels of the semantically segmented eye image 800.

A pixel of the semantically segmented eye image 800 can have one of four color values. For example, a pixel 804 of the semantically segmented eye image 800 can have a color value that corresponds to a background 808 of the eye image (denoted as "first color value" in FIG. 8). The color value that corresponds to the background 808 of the eye image can have a numeric value such as one. The background 808 of the eye image can include regions that correspond to eyelids, eyebrows, eyelashes, or skin surrounding the eye 200. As another example, a pixel of the semantically segmented eye image 800 can have a color value that corresponds to a sclera 208 of the eye 200 in the eye image (denoted as "second color value" in FIG. 8). The color value that corresponds to the sclera 208 of the eye 200 in the eye image can have a numeric value such as two. As yet example, a pixel of the semantically segmented eye image 800 can have a color value that corresponds to an iris 212 of the eye 200 in the eye image (denoted as "third color value" in FIG. 8). The color value that corresponds to the iris 212 of the eye 200 in the eye image can have a numeric value such as three. As another example, a pixel 812 of the semantically segmented eye image 800 can have a color value that corresponds to a pupil 216 of the eye 200 in the eye image (denoted as "fourth color value" in FIG. 8). The color value that corresponds to the pupil 216 of the eye 200 in the eye image can have a numeric value such as four. In FIG. 8, curve 216*a* shows the pupillary boundary between the pupil 216 and the iris 212, and curve 212*a* shows the limbic boundary between the iris 212 and the sclera 208 (the "white" of the eye).

With reference to FIG. 7, at block 712, a pupil contour of the eye 200 in the eye image can be determined. The pupil contour can be the curve 216*a* that shows the pupillary boundary between the pupil 216 and the iris 212. The pupil contour can be determined using an example process 900 illustrated in FIG. 9 (described in greater detail below). At block 716, an iris contour of the eye 200 in the eye image can be determined. The iris contour can be the curve 212*a* that shows the limbic boundary between the iris 212 and the sclera 208. The iris contour can be determined using the example process 900 illustrated in FIG. 9 (described in greater detail below). The processes used for determining the pupil contour and the iris contour can be the same or can be optimized for each determination because, for example, the pupil size and the iris size can be different.

At block 720, a mask image for an irrelevant area in the eye image can be determined. The mask image can have a dimension of n pixels×m pixels, where n denotes the height in pixels and m denotes the width in pixels of the mask image. A dimension of the semantically segmented eye image 800 and a dimension of the mask image can be the same or can be different. The mask can be a binary mask image. A pixel of the binary mask image can have a value of zero or a value of one. The pixel of the binary mask image can have a value of zero if a corresponding pixel in the semantically segmented eye image 800 has a value greater than or equal to, for example, the third color value such as the numeric value of three. The pixel of the binary mask image can have a value of one if a corresponding pixel in the semantically segmented eye image 800 does not have a value greater than or equal to, for example, the third color value such as the numeric value of three. In some implementations, the process 700 can optionally create a polar image of the iris 212 of the eye 200 in the eye image using the pupil contour, the iris contour, and the mask for the irrelevant area in the semantically segmented eye image. The process 700 ends at block 724.

Example Process of Determining a Pupil Contour or an Iris Contour

Figure 9:
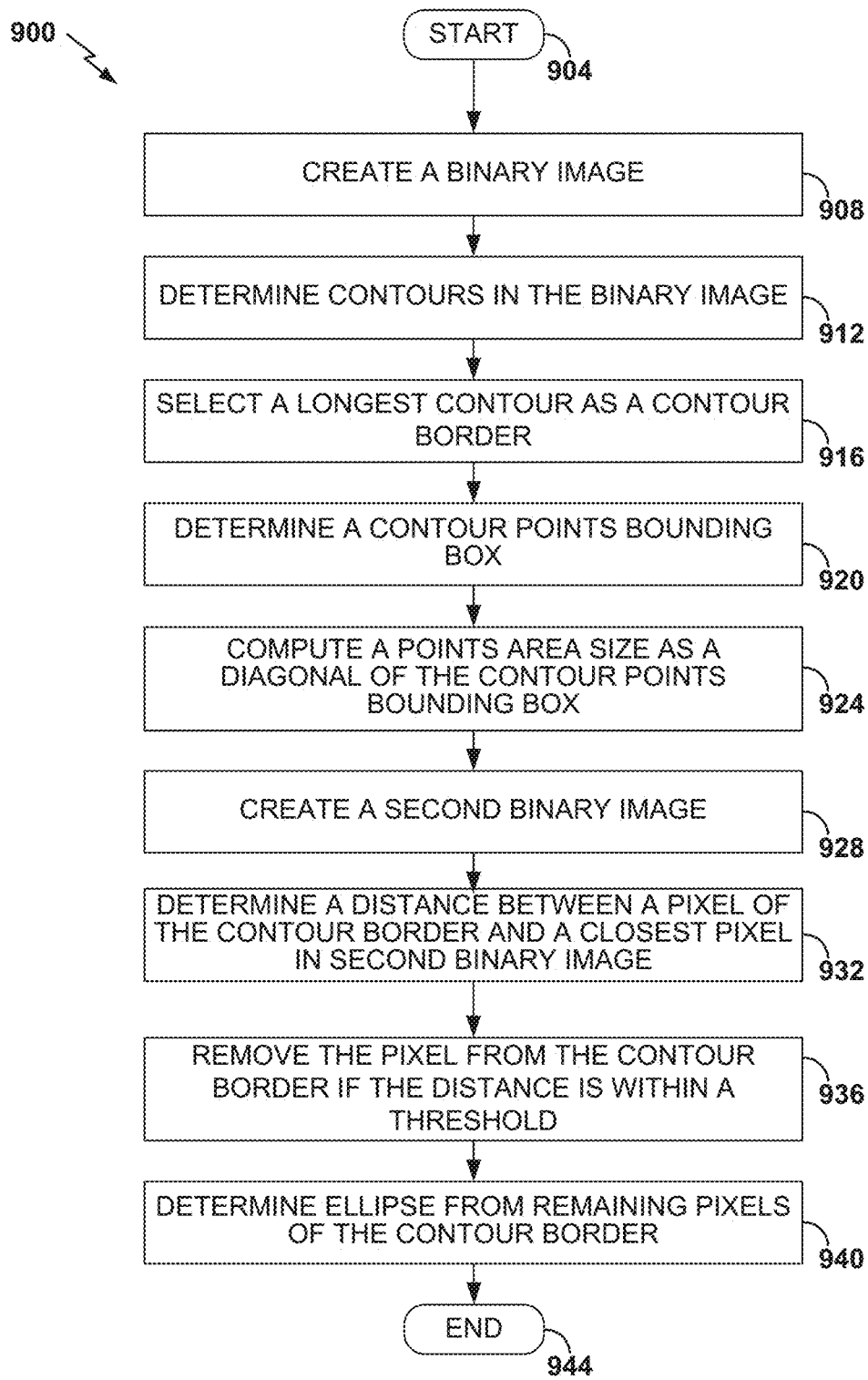
FIG. 9 is a flow diagram of an example process of determining a pupil contour or an iris contour in a segmented eye image.

FIG. 9 is a flow diagram of an example process 900 of determining a pupil contour or an iris contour in a segmented eye image. The process 900 starts at block 904. At block 908, a binary image can be created from a segmented eye image, such as the semantically segmented eye image 800. FIG. 10A schematically illustrates an example binary image 1000A created at block 904. The binary image 1000A can have a dimension of n pixels×m pixels, where n denotes the height in pixels and m denotes the width in pixels of the binary image 1000A. The dimension of the segmented eye image or the semantically segmented eye image 800 and the dimension of the binary image 1000A can be the same or can be different.

A pixel 1004*a* of the binary image 1000A can have a color value of zero if a corresponding pixel in the semantically segmented eye image 800 has a value not greater than or equal to a threshold color value, for example the "fourth color value." A pixel 1012*a* of the binary image 1000A can have a color value of one if a corresponding pixel in the semantically segmented eye image 800 has a value greater than or equal to a threshold color value, for example the "fourth color value." In some implementations, pixels of the binary image 1000A can have values other than zero or one. For example, the pixel 1004*a* of the binary image 1000A can have a color value of "third color value" such as the numeric value three. The pixel 1012*a* of the binary image 1000A can have a color value of "fourth color value," such as the numeric value fourth, where the "fourth color value" is greater than the "third color value".

Figure 10B:
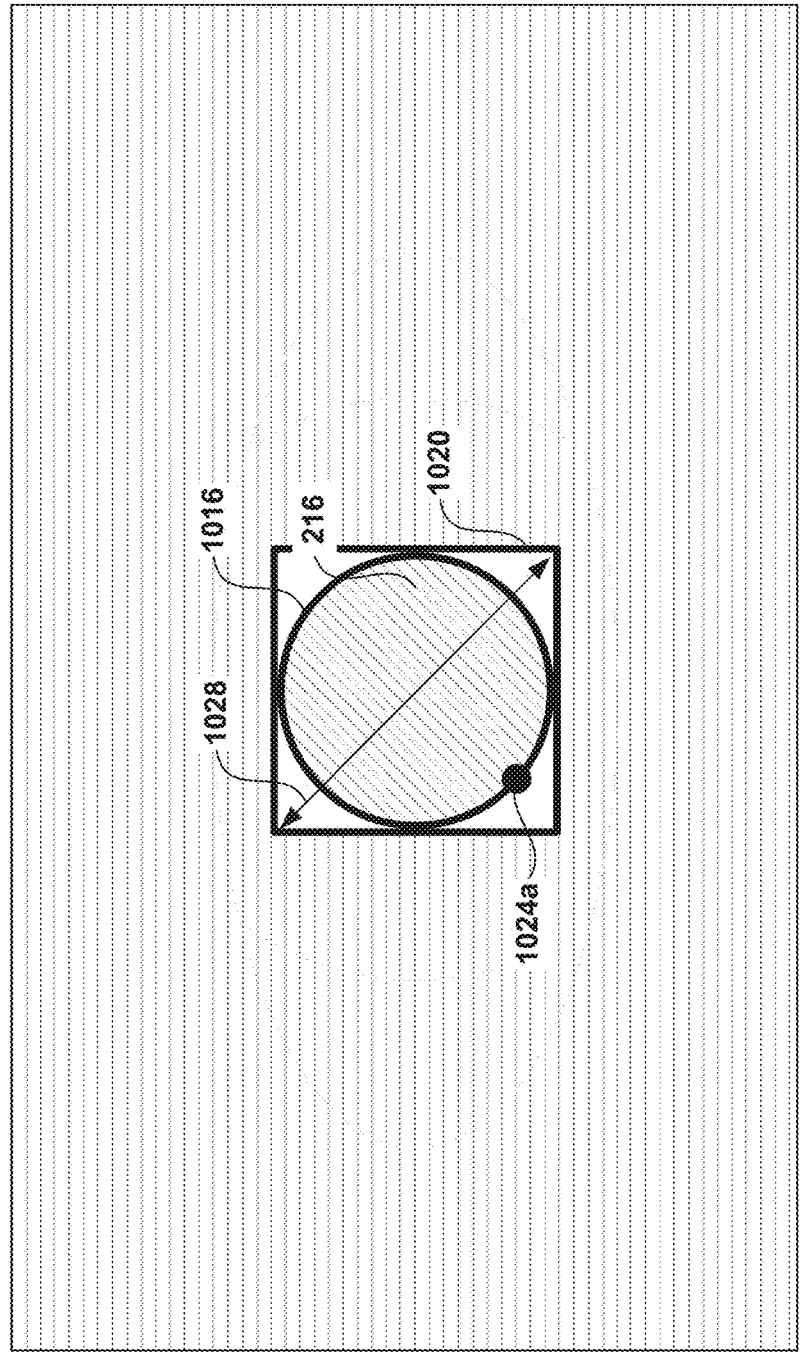

With reference to FIG. 9, at block 912, contours in the binary image 1000A are determined. For example, contours in the binary image 1000A can be determined using, for example, the OpenCV findContours function (available from opencv.org). FIG. 10B schematically illustrates an example contour 1016 in the binary image 1000A. Referring to FIG. 9, at block 916, a contour border can be determined. The contour border can be a longest contour in the binary image 1000A. The contour 1016 in the binary image 1000A can be the longest contour in the binary image 1000A. The contour 1016 can include a plurality of pixels of the binary image 1000A, such as the pixel 1024*a*.

At block 920, a contour points bounding box (e.g., a contour points bounding box 1020 in FIG. 10B) is determined. The contour points bounding box 1020 can be a smallest rectangle enclosing the longest contour border such as the contour border 1016. At block 924, a points area size can be determined. The points area size can be a diagonal 1028 of the contour points bounding box 1020 in the binary image 1000A in FIG. 10B.

At block 928, a second binary image can be created from a segmented eye image, such as the semantically segmented eye image 800. FIG. 10C schematically illustrates an example second binary image 1000C. The second binary image 1000C can have a dimension of n pixels×m pixels, where n denotes the height in pixels and m denotes the width in pixels of the second binary image 1000C. The dimension of the binary image 1000A and the dimension of the binary image 1000A can the same or can be different.

A pixel 1004*c* of the second binary image 1000C can have a color value of zero if a corresponding pixel in the semantically segmented eye image 800 has a value not greater than or equal to a threshold color value, for example the "third color value." A pixel 1012*c* of the second binary image 1000C can have a color value of one if a corresponding pixel in the semantically segmented eye image 800 has a value greater than or equal to a threshold color value, for example the "third color value." In some implementations, pixels of the second binary image 1000C can have values other than zero or one. For example, the pixel 1004*c* of the second binary image 1000C can have a color value of "second color value" such as the numeric value two. The pixel 1012*c* of the second binary image 1000B can have a color value of "third color value," such as the numeric value three, where the "third color value" is greater than the "second color value".

With reference to FIG. 9, at block 932, a pixel (e.g. a pixel 1024*c* in FIG. 10) in the second binary image 1000C that corresponds to the pixel 1024*a* in the binary image 1000A is determined. If a dimension of the second binary image 1000C and a dimension of the binary image 1000A are the same, then the pixel 1024*c* can have a coordinate of $(m_1; n_1)$ in the second binary image 1000C and the pixel 1024a can have a coordinate of ($m_1$; $n_1$) in the binary image 1000A, wherein $m_1$ denotes the coordinate in the width direction and $n_1$ denotes the coordinate in the height direction. A distance between the pixel 1024c and a pixel in the second binary image 1000C that has a color value of 0 and is closest to the pixel 1024c is determined. For example, the distance can be a distance 1032 in FIG. 10C between the pixel 1024c and the pixel 1036 in the second binary image 1000C that has a color value of 0 and is closest to the pixel 1024c. The distance 1032 can be determined using, for example, the OpenCV distanceTransform function.

At block 936, the pixel 1024a can be removed from the pixels of the contour 1016 if it is inappropriate for determining a pupil contour. The pixel 1024a can be inappropriate for determining a pupil contour if the distance 1032 is smaller than a predetermined threshold. The predetermined threshold can be a fraction multiplied by a size of the contour points bounding box 1020, such as the points area size or a size of a diagonal 1028 of the contour points bounding box 1020 in FIG. 10B. The fraction can be in the range from 0.02 to 0.20. For example, the fraction can be 0.08.

At block 940, a pupil contour can be determined from the remaining pixels of the contour border 1016 by fitting a curve (such as an ellipse) to the remaining pixels. The ellipse can be determined using, for example, the OpenCV fitEllipse function. The process 900 ends at block 944. Although FIGS. 10A-10C has been used to illustrates using the process 900 to determine a pupil contour, the process 900 can also be used to determine an iris contour.

Example Pupil Contour and Iris Contour Determination

Figure 11:
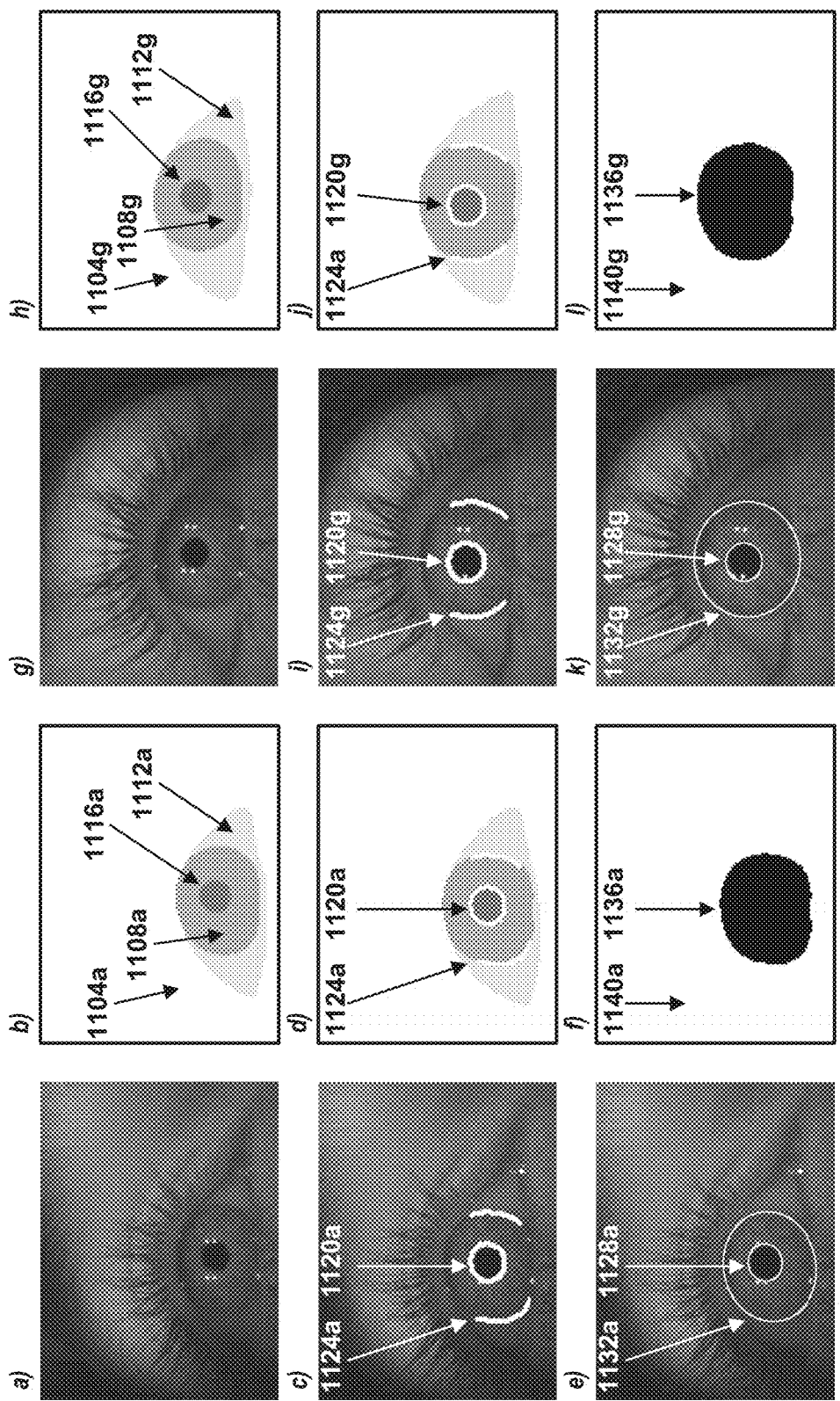
FIG. 11 shows example results of determining pupil contours, iris contours, and masks for irrelevant image areas using the example process illustrated in FIGS. 7 and 9.

FIG. 11 show example results of determining iris contours, pupil contours, and masks for irrelevant image areas using the example processes 700 and 900 illustrated in FIGS. 7 and 9. FIG. 11, panels a1 show example results of determining an iris contour, a pupil contour, and a mask for irrelevant image area of an eye image. FIG. 11, panel a shows an eye image. FIG. 11, panel b shows a semantically segmented eye image of the eye image in FIG. 11, panel a using a convolutional neural network 100 with the merged convolutional network architecture illustrated in FIG. 3. The semantically segmented eye images included a background region 1104a with a numeric color value of one, a sclera region 1108a with a numeric color value of two, an iris region 1112a with a numeric color value of three, or a pupil region 1116a of the eye image with a numeric color value of four.

FIG. 11, panels c shows the remaining pixels 1120a of a contour border of the pupil and the remaining pixels 1124a of a contour border of the iris overlaid on the eye image shown in FIG. 11, panel a determined using the process 900 at block 936. FIG. 11, panels d shows the remaining pixels 1120a of the contour border of the pupil and the remaining pixels 1124a of the contour border of the iris overlaid on the semantically segmented eye image shown in FIG. 11, panel b. FIG. 11, panel e shows an ellipse of the pupil 1128a and an ellipse of the iris 1132a determined by fitting the remaining pixels of the contour border of the pupil 1120a and the contour border of the iris 1124a by the process 900 at block 940. FIG. 11, panels f shows a binary mask image for an irrelevant area in the eye image by the process 700 at block 720. The binary mask image includes a region 1136a that corresponds to the iris region 1112a and the pupil region 1116a of the semantically segmented eye image shown in FIG. 11, panel b. The binary mask image also includes a region 1140a that corresponds to the background region 1104a and the sclera region 1108a.

Similar to FIG. 11, panels a1, FIG. 11, panels g-1 show example results of determining an iris contour, a pupil contour, and a mask for irrelevant image area of another eye image.

Figure 12:
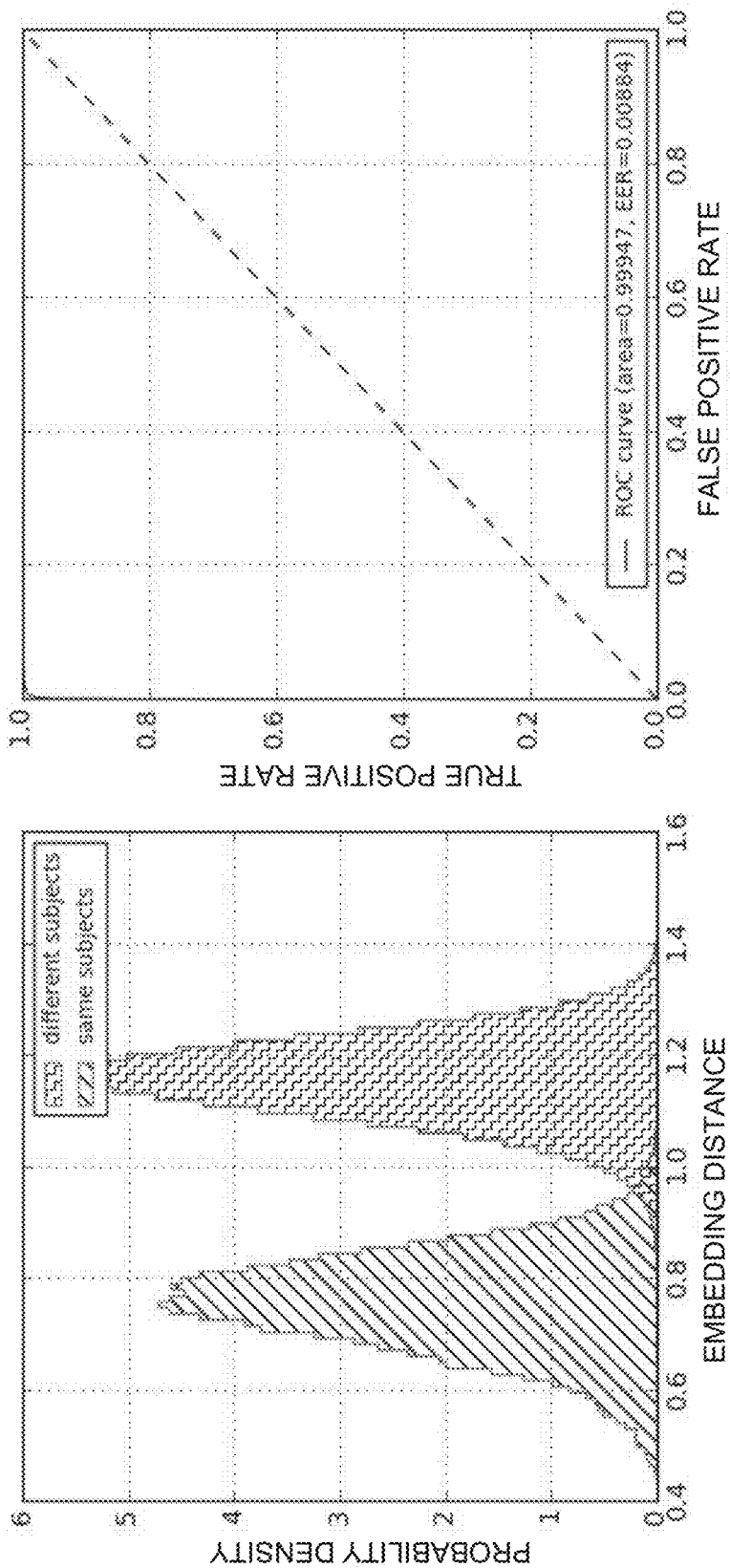
FIGS. 12A-12B show example results of training a convolutional neural network with a triplet network architecture on iris images in polar coordinates obtained after fitting pupil contours and iris contours with the example processes shown in FIGS. 7 and 9.
Figure 13:
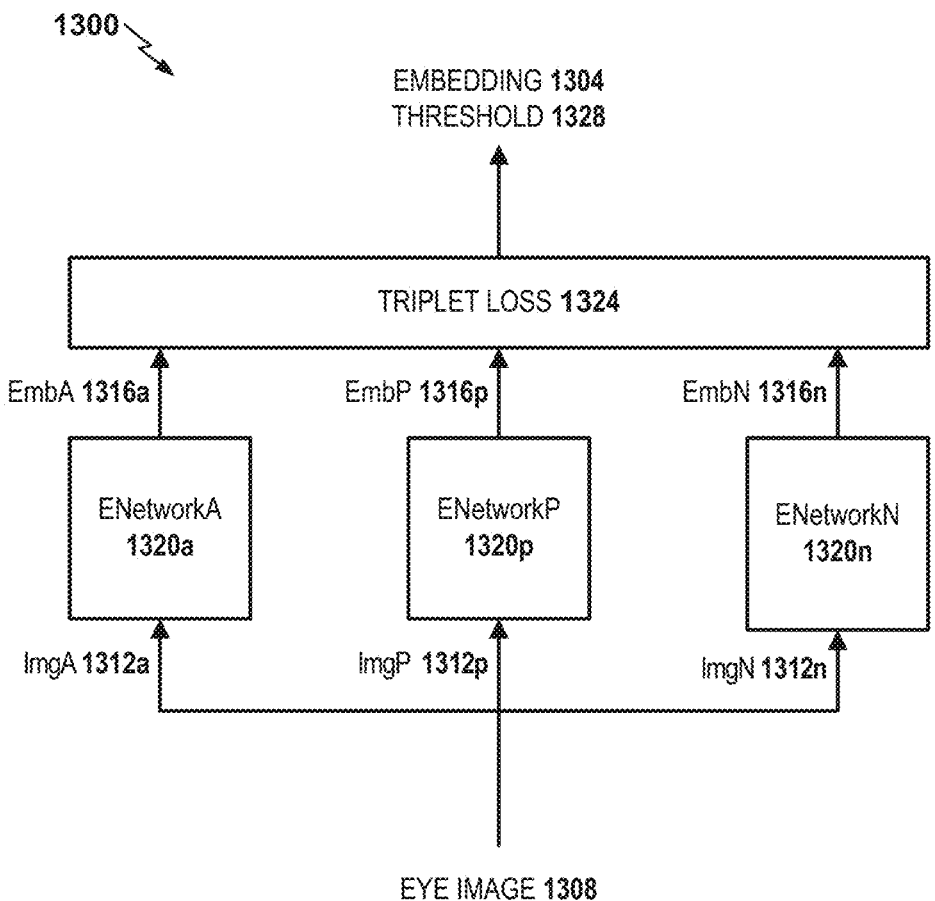
FIG. 13 is a block diagram of an example convolutional neural network with a triplet network architecture.

Example Iris Authentication Using a CNN with a Triplet Network Architecture Trained on Segmented Polar Images FIGS. 12A-12B show example results of training a convolutional neural network (CNN) with a triplet network architecture on iris images in polar coordinates obtained after fitting pupil contours and iris contours with the example processes shown in FIGS. 7 and 9. The triplet network architecture is shown in FIG. 13 and described in greater detail below.

FIG. 12A is a histogram plot of the probability density vs. embedding distance. The iris images of the same subjects were closer together in the embedding space, and the iris images of different subjects were further away from one another in the embedding space. FIG. 12B is a receiver characteristic (ROC) curve of true positive rate (TPR) vs. false positive rate (FPR). The area under the ROC curve was 99.947%. Using iris images in polar coordinates to train the CNN with a triplet network architecture, 0.884% EER was achieved.

Triplet Network Architecture

Using images of the human eye, a convolutional neural network (CNN) with a triplet network architecture can be trained to learn an embedding that maps from the higher dimensional eye image space to a lower dimensional embedding space. The dimension of the eye image space can be quite large. For example, an eye image of 256 pixels by 256 pixels can potentially include thousands or tens of thousands of degrees of freedom. FIG. 13 is a block diagram of an example convolutional neural network 1300 with a triplet network architecture. A CNN 1300 can be trained to learn an embedding 1304 (Emb). The embedding 1304 can be a function that maps an eye image (Img) 1308 in the higher dimensional eye image space into an embedding space representation (EmbImg) of the eye image in a lower dimensional embedding space. For example, Emb(Img)=EmbImg. The eye image (Img) 1308 can be an iris image in polar coordinates computed using a pupil contour and an iris contour determined with the example processes shown in FIGS. 7 and 9.

The embedding space representation, a representation of the eye image in the embedding space, can be an n-dimensional real number vectors. The embedding space representation of an eye image can be an n-dimensional eye description. The dimension of the representations in the embedding space can be different in different implementations. For example, the dimension can be in a range from 16 to 2048. In some implementations, n is 128. The elements of the embedding space representations can be represented by real numbers. In some architectures, the embedding space representation is represented as n floating point numbers during training but it may be quantized to n bytes for authentication. Thus, in some cases, each eye image is represented by an n-byte representation. Representations in an embedding space with larger dimension may perform better than those with lower dimension but may require more training. The embedding space representation can have, for example, unit length.

The CNN 1300 can be trained to learn the embedding 1304 such that the distance between eye images, independent of imaging conditions, of one person (or of one person's left or right eye) in the embedding space is small because they are clustered together in the embedding space. In contrast, the distance between a pair of eye images of different persons (or of a person's different eye) can be large in the embedding space because they are not clustered together in the embedding space. Thus, the distance between the eye images from the same person in the embedding space, the embedding distance, can be smaller than the distance between the eye images from different persons in the embedding space. The distance between two eye images can be, for example, the Euclidian distance (a L2 norm) between the embedding space representations of the two eye images.

The distance between two eye images of one person, for example an anchor eye image (ImgA) 1312a and a positive eye image (ImgP) 1312p, can be small in the embedding space. The distance between two eye images of different persons, for example the anchor eye image (ImgA) 1312a and a negative eye image (ImgN) 1312n can be larger in the embedding space. The ImgA 1312a is an "anchor" image because its embedding space representation can be compared to embedding space representations of eye images of the same person (e.g., the ImgP 1312p) and different persons (e.g., ImgN 1312n). ImgA 1312p is a "positive" image because the ImgP 1312p and the ImgA 1312a are eye images of the same person. The ImgN 1312n is a "negative" image because the ImgN 1312n and the ImgA 1312a are eye images of different persons. Thus, the distance between the ImgA 1312a and the ImgP 1312p in the embedding space can be smaller than the distance between the ImgA 1312a and the ImgN 1312N in the embedding space.

The embedding network (Emb) 1304 can map the ImgA 1312a, the ImgP 1312p, and the ImgN 1312n in the higher dimensional eye image space into an anchor embedding image (EmbA) 1316a, a positive embedding image (EmbP) 1316a, and a negative embedding image (EmbN) 1316n. For example, Emb(ImgA)=EmbA; Emb(ImgP)=EmbP; and Emb(ImgN)=EmbN. Thus, the distance between the EmbA 1316a and the EmbP 1316a in the embedding space can be smaller than the distance between EmbP 1316a and EmbN 1316n in the embedding space.

To learn the embedding 1304, a training set T1 of eye images 1308 can be used. The eye images 1380 can be iris images in polar coordinates computed using a pupil contour and an iris contour determined with the example processes shown in FIGS. 7-9. The eye images 1308 can include the images of left eyes and right eyes. The eye images 1308 can be associated with labels, where the labels distinguish the eye images of one person from eye images of another person. The labels can also distinguish the eye images of the left eye and the right eye of a person. The training set T1 can include pairs of eye image and label (Img; Label). The training set T1 of (Img; Label) pairs can be received from an eye image data store.

To learn the embedding 1304, the CNN 1300 with a triplet network architecture can include three identical embedding networks, for example an anchor embedding network (ENetworkA) 1320a, a positive embedding network (ENetworkP) 1320p, and a negative embedding network (ENetworkN) 1320n. The embedding networks 1320a, 1320p, or 1320n can map eye images from the eye image space into embedding space representations of the eye images in the embedding space. For example, the ENetworkA 1320a can map an ImgA 1312a into an EmbA 1316a. The ENetworkA 1320p can map an ImgP 1312p into an EmbP 1316p. The ENetworkN 1320n can map an ImgN 1312n into an EmbN 1316n.

The convolutional neural network 1300 with the triplet network architecture can learn the embedding 1304 with a triplet training set T2 including triplets of eye images. Two eye images of a triplet are from the same person, for example the ImgA 1312a and the ImgP 1312p. The third eye image of the triplet is from a different person, for example the ImgN 1312n. The ENetworkA 1320a, the ENetworkP 1320p, and the ENetworkN 1320n can map triplets of (ImgA; ImgP; ImgN) into triplets of (EmbA; EmbP; EmbN). The eye authentication trainer 1304 can generate the triplet training set T2 from the training set T1 of (Img; Label) pairs.

The ImgA 1312a, the ImgP 1312p, or the ImgN 1312n can be different in different implementations. For example, the ImgA 1312a and the ImgP 1312p can be eye images of one person, and the ImgN 1312n can be an eye image of another person. As another example, the ImgA 1312a and the ImgP 1312p can be images of one person's left eye, and the ImgN 1312n can be an image of the person's right eye or an eye image of another person.

The triplet network architecture can be used to learn the embedding 1304 such that an eye image of a person in the embedding space is closer to all other eye images of the same person in the embedding space than it is to an eye image of any other person in the embedding space. For example, $|EmbA-EmbP|<|EmbA-EmbN|$, where $|EmbA-EmbP|$ denotes the absolute distance between the EmbA 1316a and the EmbP 1316p in the embedding space, and $|EmbA-EmbN|$ denotes the absolute distance between the EmbA 1316a and the EmbN 1316n in the embedding space.

In some implementations, the triplet network architecture can be used to learn the embedding 1304 such that an image of a person's left eye in the embedding space is closer to all images of the same person's left eye in the embedding space than it is to any image of the person's right eye or any eye image of another person in the embedding space.

The dimension of the embedding space representations can be different in different implementations. The dimension of the EmbA 1316a, EmbP 1316p, and EmbN 1316n can be the same, for example 431. The length of the embedding space representation can be different in different implementations. For example, the EmbA 1316a, EmbP 1316p, or EmbN 1316n can be normalized to have unit length in the embedding space using L2 normalization. Thus, the embedding space representations of the eye images are on a hypersphere in the embedding space.

The triplet network architecture can include a triplet loss layer 1324 configured to compare the EmbA 1316a, the EmbP 1316p, and the EmbN 1316n. The embedding 1304 learned with the triplet loss layer 1324 can map eye images of one person onto a single point or a cluster of points in close proximity in the embedding space. The triplet loss layer 1324 can minimize the distance between eye images of the same person in the embedding space, for example the EmbA 1316a and the EmbP 1316p. The triplet loss layer 1324 can maximize the distance between eye images of different persons in the embedding space, for example EmbA 1316a, and the EmbN 1316n.

The triplet loss layer 1324 can compare the EmbA 1316a, the EmbP 1316p, and the EmbN 1316n in a number of ways. For example, the triplet loss layer 1324 can compare the EmbA 1316a, the EmbP 1316p, and the EmbN 1316n by computing:

$$\text{Maximum}(0, |EmbA-EmbP|^2 - |EmbA-EmbN|^2 + m), \quad \text{Equation (1)}$$

where $|EmbA-EmbP|$ denotes the absolute distance between the EmbA 1316a and the EmbP 1316p in the embedding space, $|EmbA-EmbN|$ denotes the absolute distance between the EmbA 1316*a* and the EmbN 1316*n*, and *m* denotes a margin. The margin can be different in different implementations. For example, the margin can be 0.16 or another number in a range from 0.01 to 1.0. Thus, in some implementations, the embedding 1304 can be learned from eye images of a plurality of persons, such that the distance in the embedding space between the eye images from the same person is smaller than the distance in the embedding space between eye images from different persons. In terms of the particular implementation of Equation (1), the squared distance in the embedding space between all eye images from the same person is small, and the squared distance in the embedding space between a pair of eye images from different persons is large.

The function of the margin m used in comparing the EmbA 1316*a*, the EmbP 1316*p*, and the EmbN 1316*n* can be different in different implementations. For example, the margin m can enforce a margin between each pair of eye images of one person and eye images of all other persons in the embedding space. Accordingly, the embedding space representations of one person's eye images can be clustered closely together in the embedding space. At the same time, the embedding space representations of different persons' eye images can be maintained or maximized. As another example, the margin m can enforce a margin between each pair of images of one person's left eye and images of the person's right eye or eye images of all other persons.

During an iteration of the learning of the embedding 1304, the triplet loss layer 1324 can compare the EmbA 1316*a*, the EmbP 1316*p*, and the EmbN 1316*n* for different numbers of triplets. For example, the triplet loss layer 1324 can compare the EmbA 1316*a*, the EmbP 1316*p*, and the EmbN 1316*n* for all triplets (EmbA; EmbP; EmbN) in the triplet training set T2. As another example, the triplet loss layer 1324 can compare the EmbA 1316*a*, the EmbP 1316*p*, and EmbN 1316*n* for a batch of triplets (EmbA; EmbP; EmbN) in the triplet training set T2. The number of triplets in the batch can be different in different implementations. For example, the batch can include 64 triplets of (EmbA; EmbP; EmbN). As another example, the batch can include all the triplets (EmbA; EmbP; EmbN) in the triplet training set T2.

During an iteration of learning the embedding 1304, the triplet loss layer 1324 can compare the EmbA 1316*a*, the EmbP 1316*p*, and the EmbN 1316*n* for a batch of triplets (EmbA; EmbP; EmbN) by computing a triplet loss. The triplet loss can be, for example, $\Sigma_{i=1}^{n}$ Maximum(0,|EmbA(i)-EmbP(i)|$^2$-|EmbA(i)-EmbN(i)|$^2$+m), Equation (2) where n denotes the number of triplets in the batch of triplets; and EmbA(i), EmbP(i), and EmbN(i) denotes the ith EmbA 1316*a*, EmbP 1316*p*, and EmbN 1316*n* in the batch of triplets.

During the learning of the embedding 1304, the eye authentication trainer 1304 can update the ENetworkA 1320*a*, the ENetworkP 1320*p*, and the ENetworkN 1320*n* based on the comparison between a batch of triplets (EmbA; EmbP; EmbN), for example the triplet loss between a batch of triplets (EmbA; EmbP; EmbN). The eye authentication trainer 1304 can update the ENetworkA 1320*a*, the ENetworkP 1320*p*, and the ENetworkN 1320*n* periodically, for example every iteration or every 1,000 iterations. The eye authentication trainer 1304 can update the ENetworkA 1320*a*, the ENetworkP 1320*p*, and the ENetworkN 1320*n* to optimize the embedding space. Optimizing the embedding space can be different in different implementations. For example, optimizing the embedding space can include minimizing Equation (2). As another example, optimizing the embedding space can include minimizing the distance between the EmbA 1316*a* and the EmbP 1316*p* and maximizing the distance between the EmbA 1316*a* and the EmbN 1316*n*.

After iterations of optimizing the embedding space, one or more of the following can be computed: an embedding 1304 that maps eye images from the higher dimensional eye image space into representations of the eye images in a lower dimensional embedding space; or a threshold value 1328 for a user device to determine whether the embedding space representation of an user's eye image is similar enough to an authorized user's eye image in the embedding space such that the user should be authenticated as the authorized user. The embedding 1304 or the threshold value 1328 can be determined without specifying the features of eye images that can or should use in computing the embedding 1304 or the threshold value 1328.

The threshold value 1328 can be different in different implementations. For example, the threshold value 1328 can be the largest distance between eye images of the same person determined from the (ImgA; ImgP; ImgN) triplets during the last iteration of learning the embedding 1304. As another example, the threshold value 1328 can be the median distance between eye images of the same person determined from the (ImgA; ImgP; ImgN) triplets during the last iteration of learning the embedding 1304. As yet another example, the threshold value 1328 can be smaller than the largest distance between eye images of the different persons determined from the (ImgA; ImgP; ImgN) triplets during the last iteration of learning the embedding 1304.

The number of iterations required to learn the embedding 1304 can be different in different implementations. For example, the number of iterations can be 100,000. As another example, the number of iterations may not be predetermined and can depend on iterations required to learn an embedding 1304 with satisfactory characteristics such as having an equal error rate (EER) of 2%. As yet another example, the number of iterations can depend on iterations required to obtain a satisfactory triplet loss.

The ability of the embedding 1304 to distinguish unauthorized users and authorized users can be different in different implementations. For example, the false positive rate (FPR) of the embedding 1304 can be 0.01%; and the true positive rate (TPR) of the embedding 1304 can be 99.99%. As another example, the false negative rate (FNR) of the embedding 1304 can be 0.01%; and the true negative rate (TNR) of the embedding 1304 can be 99.99%. The equal error rate (EER) of the embedding 1304 can be 1%, for example.

Example Wearable Display System

In some embodiments, a user device can be, or can be included, in a wearable display device, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 14:
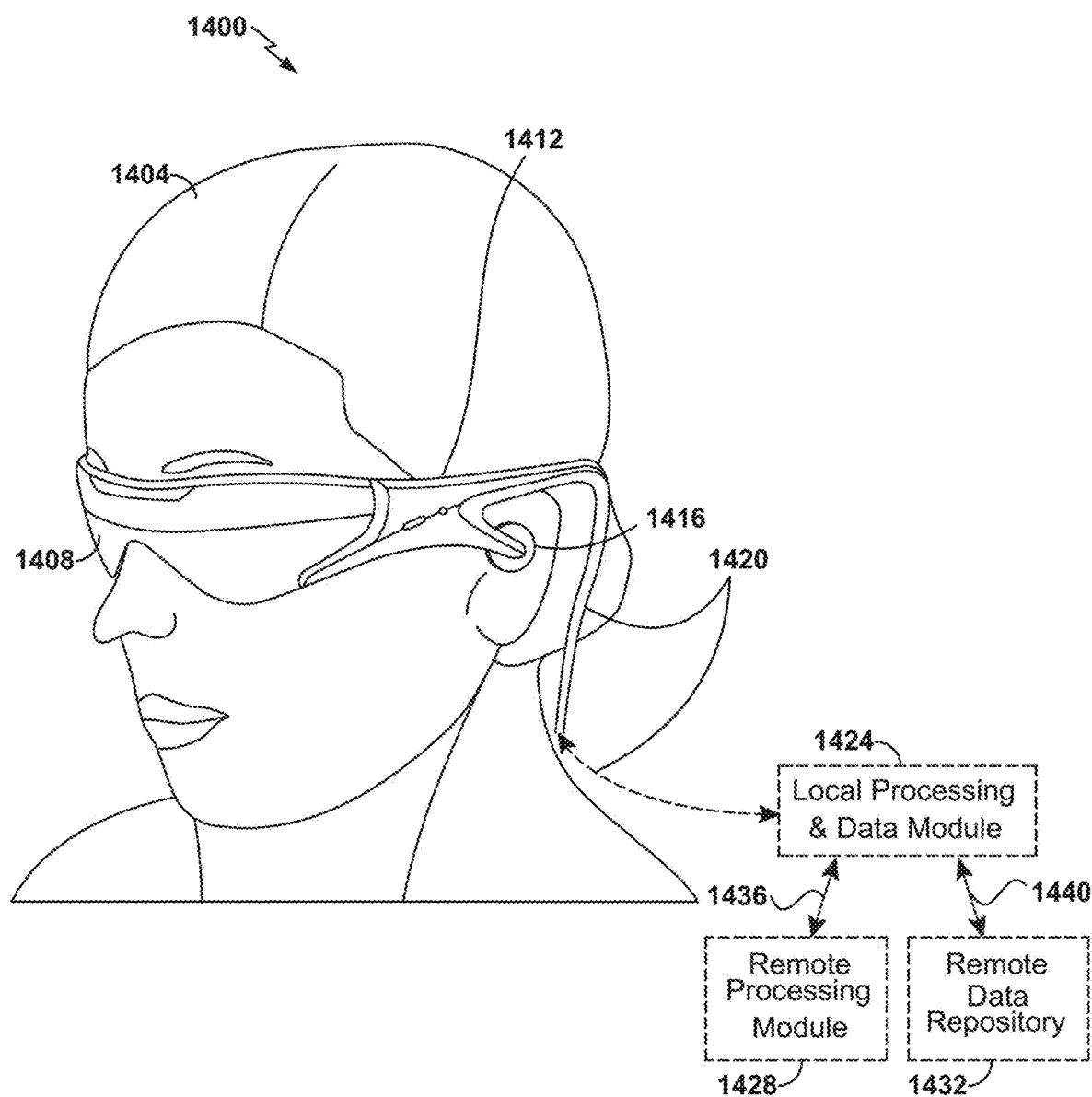
FIG. 14 schematically illustrates an example of a wearable display system.

FIG. 14 illustrates an example of a wearable display system 1400 that can be used to present a VR, AR, or MR experience to a display system wearer or viewer 1404. The wearable display system 1400 may be programmed to perform any of the applications or embodiments described herein (e.g., eye image segmentation, eye image quality estimation, pupil contour determination, or iris contour determination). The display system 1400 includes a display 1408, and various mechanical and electronic modules and systems to support the functioning of that display 1408. The display 1408 may be coupled to a frame 1412, which is wearable by the display system wearer or viewer 1404 and which is configured to position the display 1408 in front of the eyes of the wearer 1404. The display 1408 may be a light field display. In some embodiments, a speaker 1416 is coupled to the frame 1412 and positioned adjacent the ear canal of the user in some embodiments, another speaker, not shown, is positioned adjacent the other ear canal of the user to provide for stereo/shapeable sound control. The display 1408 is operatively coupled 1420, such as by a wired lead or wireless connectivity, to a local data processing module 1424 which may be mounted in a variety of configurations, such as fixedly attached to the frame 1412, fixedly attached to a helmet or hat worn by the user, embedded in headphones, or otherwise removably attached to the user 1404 (e.g., in a backpack-style configuration, in a belt-coupling style configuration).

The local processing and data module 1424 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 1412 or otherwise attached to the wearer 1404), such as image capture devices (such as cameras), microphones, inertial measurement units, accelerometers, compasses, GPS units, radio devices, and/or gyros; and/or (b) acquired and/or processed using remote processing module 1428 and/or remote data repository 1432, possibly for passage to the display 1408 after such processing or retrieval. The local processing and data module 1424 may be operatively coupled to the remote processing module 1428 and remote data repository 1432 by communication links 1436, 1440, such as via a wired or wireless communication links, such that these remote modules 1428, 1432 are operatively coupled to each other and available as resources to the local processing and data module 1424. The image capture device(s) can be used to capture the eye images used in the eye image segmentation, eye image quality estimation, pupil contour determination, or iris contour determination procedures.

In some embodiments, the remote processing module 1428 may comprise one or more processors configured to analyze and process data and/or image information such as video information captured by an image capture device. The video data may be stored locally in the local processing and data module 1424 and/or in the remote data repository 1432. In some embodiments, the remote data repository 1432 may comprise a digital data storage facility, which may be available through the internet or other networking configuration in a "cloud" resource configuration. In some embodiments, all data is stored and all computations are performed in the local processing and data module 1424, allowing fully autonomous use from a remote module.

In some implementations, the local processing and data module 1424 and/or the remote processing module 1428 are programmed to perform embodiments of eye image segmentation, eye image quality estimation, pupil contour determination, or iris contour determination disclosed herein. For example, the local processing and data module 1424 and/or the remote processing module 1428 can be programmed to perform embodiments of the processes 500, 600, 700, or 900 described with reference to FIG. 5, 6, 7, or 9. The local processing and data module 1424 and/or the remote processing module 1428 can be programmed to use the eye image segmentation, eye image quality estimation, pupil contour determination, or iris contour determination techniques disclosed herein in biometric extraction, for example to identify or authenticate the identity of the wearer 1404. The image capture device can capture video for a particular application (e.g., video of the wearer's eye for an eye-tracking application or video of a wearer's hand or finger for a gesture identification application). The video can be analyzed using the CNN 100 by one or both of the processing modules 1424, 1428. In some cases, off-loading at least some of the eye image segmentation, eye image quality estimation, pupil contour determination, or iris contour determination to a remote processing module (e.g., in the "cloud") may improve efficiency or speed of the computations. The parameters of the CNN 100 (e.g., weights, bias terms, subsampling factors for pooling layers, number and size of kernels in different layers, number of feature maps, etc.) can be stored in data modules 1424 and/or 1432.

The results of the video analysis (e.g., the output of the CNN 100) can be used by one or both of the processing modules 1424, 1428 for additional operations or processing. For example, in various CNN applications, biometric identification, eye-tracking, recognition or classification of gestures, objects, poses, etc. may be used by the wearable display system 1400. For example, video of the wearer's eye(s) can be used for eye image segmentation or image quality estimation, which, in turn, can be used by the processing modules 1424, 1428 for iris contour determination or pupil contour determination of the wearer 1404 through the display 1408. The processing modules 1424, 1428 of the wearable display system 1400 can be programmed with one or more embodiments of eye image segmentation, eye image quality estimation, pupil contour determination, or iris contour determination to perform any of the video or image processing applications described herein.

Embodiments of the CNN 100 can be used to segment eye images and provide image quality estimation in other biometric applications. For example, an eye scanner in a biometric security system (such as, e.g., those used at transportation depots such as airports, train stations, etc., or in secure facilities) that is used to scan and analyze the eyes of users (such as, e.g., passengers or workers at the secure facility) can include an eye-imaging camera and hardware programmed to process eye images using embodiments of the CNN 100. Other applications of the CNN 100 are possible such as for biometric identification (e.g., generating iris codes), eye gaze tracking, and so forth.

Additional Aspects

In a 1st aspect, a method for eye image segmentation and image quality estimation is disclosed. The method is under control of a hardware processor and comprises: receiving an eye image; processing the eye image using a convolution neural network to generate a segmentation of the eye image; and processing the eye image using the convolution neural network to generate a quality estimation of the eye image, wherein the convolution neural network comprises a segmentation tower and a quality estimation tower, wherein the segmentation tower comprises segmentation layers and shared layers, wherein the quality estimation tower comprises quality estimation layers and the shared layers, wherein a first output layer of the shared layers is connected to a first input layer of the segmentation tower and a second input layer of the segmentation tower, wherein the first output layer of the shared layers is connected to an input layer of the quality estimation layer, and wherein receiving the eye image comprises receiving the eye image by an input layer of the shared layers.

In a 2nd aspect, the method of aspect 1, wherein a second output layer of the shared layers is connected to a third input layer of the segmentation tower.

In a 3rd aspect, the method of any one of aspects 1-2, wherein processing the eye image using the convolution neural network to generate the segmentation of the eye image comprises generating the segmentation of the eye image using the segmentation tower, and wherein an output of an output layer of the segmentation tower is the segmentation of the eye image.

In a 4th aspect, the method of aspect 3, wherein the segmentation of the eye image includes a background, a sclera, an iris, or a pupil of the eye image.

In a 5th aspect, the method of any one of aspects 1-4, wherein processing the eye image using the convolution neural network to generate the quality estimation of the eye image comprises generating the quality estimation of the eye image using the quality estimation tower, and wherein an output of an output layer of the quality estimation tower comprises the quality estimation of the eye image.

In a 6th aspect, the method of any one of aspects 1-5, wherein the quality estimation of the eye image is a good quality estimation or a bad quality estimation.

In a 7th aspect, the method of any one of aspects 1-6, wherein the shared layers, the segmentation layers, or the quality estimation layers comprise a convolution layer, a brightness normalization layer, a batch normalization layer, a rectified linear layer, an upsampling layer, a concatenation layer, a pooling layer, a fully connected layer, a linear fully connected layer, a softsign layer, or any combination thereof.

In a 8th aspect, a method for eye image segmentation and image quality estimation is disclosed. The method is under control of a hardware processor and comprises: receiving an eye image; processing the eye image using a convolution neural network to generate a segmentation of the eye image; and processing the eye image using the convolution neural network to generate a quality estimation of the eye image.

In a 9th aspect, the method of aspect 8, wherein the convolution neural network comprises a segmentation tower and a quality estimation tower, wherein the segmentation tower comprises segmentation layers and shared layers, wherein the quality estimation tower comprises quality estimation layers and the shared layers, and wherein receiving the eye image comprises receiving the eye image by an input layer of the shared layers.

In a 10th aspect, the method of aspect 9, wherein a first output layer of the shared layers is connected to a first input layer of the segmentation tower.

In a 11th aspect, the method of aspect 10, wherein the first output layer of the shared layers is connected to a second input layer of the segmentation tower.

In a 12th aspect, the method of any one of aspects 10-11, wherein the first output layer of the shared layers is connected to an input layer of the quality estimation tower.

In a 13th aspect, the method of any one of aspects 9-12, wherein processing the eye image using the convolution neural network to generate the segmentation of the eye image comprises generating the segmentation of the eye image using the segmentation tower, and wherein an output of an output layer of the segmentation tower is the segmentation of the eye image.

In a 14th aspect, the method of any one of aspects 9-13, wherein the segmentation of the eye image includes a background, a sclera, an iris, or a pupil of the eye image.

In a 15th aspect, the method of any one of aspects 9-14, wherein processing the eye image using the convolution neural network to generate the quality estimation of the eye image comprises generating the quality estimation of the eye image using the quality estimation tower, and wherein an output of an output layer of the quality estimation tower is the quality estimation of the eye image.

In a 16th aspect, the method of any one of aspects 9-15, wherein the shared layers, the segmentation layers, or the quality estimation layers comprise a convolution layer, a batch normalization layer, a rectified linear layer, an upsampling layer, a concatenation layer, a pooling layer, a fully connected layer, a linear fully connected layer, or any combination thereof.

In a 17th aspect, the method of aspect 16, wherein the batch normalization layer is a batch local contrast normalization layer or a batch local response normalization layer.

In a 18th aspect, the method of any one of aspects 9-17, wherein the shared layers, the segmentation layers, or the quality estimation layers comprise a brightness normalization layer, a softsign layer, or any combination thereof.

In a 19th aspect, the method of any one of aspects 8-18, wherein the eye image is captured by an image sensor of a user device for authentication.

In a 20th aspect, the method of any one of aspects 8-19, wherein the segmentation of the eye image comprises mostly of the iris portion of the eye image.

In a 21st aspect, the method of any one of aspects 8-19, wherein the segmentation of the eye image comprises mostly of the retina portion of the eye image.

In a 22nd aspect, a method for training a convolution neural network for eye image segmentation and image quality estimation is disclosed. The method is under control of a hardware processor and comprises: obtaining a training set of eye images; providing a convolutional neural network with the training set of eye images; and training the convolutional neural network with the training set of eye images, wherein the convolution neural network comprises a segmentation tower and a quality estimation tower, wherein the segmentation tower comprises segmentation layers and shared layers, wherein the quality estimation tower comprises quality estimation layers and the shared layers, wherein an output layer of the shared layers is connected to a first input layer of the segmentation tower and a second input layer of the segmentation tower, and wherein the output layer of the shared layers is connected to an input layer of the quality estimation layer.

In a 23rd aspect, the method of aspect 22, wherein training the convolutional neural network with the training set of eye images comprises: processing an eye image of the training set using the segmentation tower to generate a segmentation of the eye image; processing the eye image of the training set using the quality estimation tower to generate a quality estimation of the eye image; computing a first difference between the segmentation of the eye image and a reference segmentation of the eye image; computing a second difference between the quality estimation of the eye image and a reference quality estimation of the eye image; and updating parameters of the convolutional neural network using the first difference and the second difference.

In a 24th aspect, the method of aspect 23, wherein updating the parameters of the convolutional neural network using the first difference and the second difference comprises setting a first percentage of the parameters of the convolutional neural network to values of zero during a first training cycle when training the convolutional neural network.

In a 25th aspect, the method of aspect 24, wherein setting the first percentage of the parameters of the convolutional neural network to values of zero during the first training cycle when training the convolutional neural network comprises randomly setting the first percentage of the parameters of the convolutional neural network to values of zero during the first training cycle when training the convolutional neural network.

In a 26th aspect, the method of any one of aspects 24-25, wherein updating the parameters of the convolutional neural network using the first difference and the second difference further comprises setting a second percentage of the parameters of the convolutional neural network to values of zero during a second training cycle when training the convolutional neural network.

In a 27th aspect, the method of aspect 26, wherein setting the second percentage of the parameters of the convolutional neural network to values of zero during the second training cycle when training the convolutional neural network comprises randomly setting the second percentage of the parameters of the convolutional neural network to values of zero during the second training cycle when training the convolutional neural network.

In a 28th aspect, the method of aspect 27, wherein the first percentage or the second percentage is between 50% and 30%.

In a 29th aspect, the method of any one of aspects 23-28, wherein the segmentation of the eye image comprises a background, a sclera, an iris, or a pupil of the eye image, and wherein the reference segmentation of the eye image comprises a reference background, a reference sclera, a reference iris, or a reference pupil of the eye image.

In a 30th aspect, the method of any one of aspects 22-28, wherein the shared layers, the segmentation layers, or the quality estimation layers comprise a convolution layer, a brightness normalization layer, a batch normalization layer, a rectified linear layer, an upsampling layer, a concatenation layer, a pooling layer, a fully connected layer, a linear fully connected layer, a softsign layer, or any combination thereof.

In a 31st aspect, a computer system is disclosed. The computer system comprises: a hardware processor; and non-transitory memory having instructions stored thereon, which when executed by the hardware processor cause the processor to perform the method of any one of aspects 1-30.

In a 32nd aspect, the computer system of aspect 31, wherein the computer system comprises a mobile device.

In a 33rd aspect, the computer system of aspect 32, wherein the mobile device comprises a wearable display system.

In a 34th aspect, a method for determining eye contours in a semantically segmented eye image is disclosed. The method is under control of a hardware processor and comprises: receiving a semantically segmented eye image of an eye image comprising a plurality of pixels, wherein a pixel of the semantically segmented eye image has a color value, wherein the color value of the pixel of the semantically segmented eye image is a first color value, a second color value, a third color value, and a fourth color value, wherein the first color value corresponds to a background of the eye image, wherein the second color value corresponds to a sclera of the eye in the eye image, wherein the third color value corresponds to an iris of the eye in the eye image, and wherein the fourth color value corresponds to a pupil of the eye in the eye image; determining a pupil contour using the semantically segmented eye image; determining an iris contour using the semantically segmented eye image; and determining a mask for an irrelevant area in the semantically segmented eye image.

In a 35th aspect, the method of aspect 34, wherein the first color value is greater than the second color value, wherein the second color value is greater than the third color value, and wherein the third color value is greater than the fourth color value.

In a 36th aspect, the method of any one of aspects 34-35, wherein determining the pupil contour using the semantically segmented eye image comprises: creating a first binary image comprising a plurality of pixels, wherein a color value of a first binary image pixel of the first binary image is the fourth color value if a corresponding pixel in the semantically segmented eye image has a value greater than or equal to the fourth color value, and the third color value if the corresponding pixel in the semantically segmented eye image has a value not greater than or equal to the fourth color value; determining contours in the first binary image; selecting a longest contour of the determined contours in the first binary image as a pupil contour border; determining a pupil contour points bounding box enclosing the pupil contour border; computing a pupil points area size as a diagonal of the pupil contours points bounding box; creating a second binary image comprising a plurality of pixels, wherein a color value of a second binary image pixel of the plurality of pixels of the second binary image is the third color value if a corresponding pixel in the semantically segmented eye image has a value greater than or equal to the third color value, and the second color value if the corresponding pixel in the semantically segmented eye image has a value not greater than or equal to the third color value; for a pupil contour border pixel of the pupil contour border:

determining a closest pixel in the second binary image that has a color value of the second color value and that is closest to the pupil contour border pixel; determining a distance between the pupil contour border pixel and the closest pixel in the second binary image; and removing the pupil contour border pixel from the pupil contour border if the distance between the pupil contour border pixel and the closest pixel in the second binary image is smaller than a predetermined pupil contour threshold; and determining the pupil contour as an ellipse from remaining pixels of the pupil contour border.

In a 37th aspect, the method of any one of aspects 34-36, wherein determining the iris contour using the semantically segmented eye image comprises: creating a third binary image comprising a plurality of pixels, wherein a color value of a third binary image pixel of the plurality of pixels of the third binary image is the third color value if a corresponding pixel in the semantically segmented eye image has a value greater than or equal to the third color value, and the second color value if the corresponding pixel in the semantically segmented eye image has a value not greater than or equal to the third color value; determining contours in the third binary image; selecting a longest contour of the determined contours in the third binary image as an iris contour border; determining an iris contour points bounding box enclosing the iris contour border; computing an iris points area size as a diagonal of the iris contours points bounding box; creating a fourth binary image comprising a plurality of pixels, wherein a color value of a fourth binary image pixel of the plurality of pixels of the fourth binary image is the second color value if a corresponding pixel in the semantically segmented eye image has a value greater than or equal to the second color value, and the first color value if the corresponding pixel in the semantically segmented eye image has a value not greater than or equal to the second color value; for an iris contour border pixel of the contour border: determining a closest pixel in the fourth binary image that has a color value of the first color value and that is closest to the iris contour border pixel; determining a distance between the iris contour border pixel and the closest pixel in the fourth binary image; and removing the iris contour border pixel from the iris contour border if the distance between the iris contour border pixel and the closest pixel in the fourth binary image is smaller than a predetermined iris contour threshold; and determining the iris contour by determining an ellipse from remaining pixels of the iris contour border.

In a 38th aspect, the method of any one of aspects 34-37, determining the mask for the irrelevant area in the eye image comprises: creating a binary mask image comprising a plurality of pixels, wherein a binary mask image pixel of the binary mask image has a color value; setting the color value of the binary mask image pixel to the third color value if a corresponding pixel in the semantically segmented eye image has a value greater than or equal to the third color value; and setting the color value of the binary mask image pixel to the second color value if a corresponding pixel in the semantically segmented eye image has a value not greater than or equal to the third color value.

In a 39th aspect, the method of any one of aspects 36-38, wherein predetermined pupil contour threshold is a fraction multiplied by the pupil points area size, and wherein the fraction is in a range from 0.02 to 0.20.

In a 40th aspect, the method of any one of aspects 37-39, wherein the predetermined iris contour threshold is a fraction multiple by the iris points area size, and wherein the fraction is in a range from 0.02 to 0.20.

In a 41st aspect, the method of any one of aspects 34-40, further comprising creating a polar image of an iris of an eye in the eye image from the eye image using the pupil contour, the iris contour, and the mask for the irrelevant area in the semantically segmented eye image.

In a 42nd aspect, the method of any one of aspects 34-41, wherein receiving the semantically segmented eye image of an eye image comprising a plurality of pixels comprises: receiving an eye image; processing the eye image using a convolution neural network to generate the semantically segmented eye image; and processing the eye image using the convolution neural network to generate a quality estimation of the eye image, wherein the convolution neural network comprises a segmentation tower and a quality estimation tower, wherein the segmentation tower comprises segmentation layers and shared layers, wherein the quality estimation tower comprises quality estimation layers and the shared layers, wherein a first output layer of the shared layers is connected to a first input layer of the segmentation tower and a second input layer of the segmentation tower, wherein the first output layer of the shared layers is connected to an input layer of the quality estimation layer, and wherein receiving the eye image comprises receiving the eye image by an input layer of the shared layers.

In a 43rd aspect, a method for determining eye contours in a semantically segmented eye image is disclosed. The method is under control of a hardware processor and comprises: receiving a semantically segmented eye image of an eye image; determining a pupil contour of an eye in the eye image using the semantically segmented eye image; determining an iris contour of the eye in the eye image using the semantically segmented eye image; and determining a mask for an irrelevant area in the eye image.

In a 44th aspect, the method of aspect 43, wherein a dimension of the semantically segmented eye image and a dimension of the mask image are the same.

In a 45th aspect, the method of any one of aspects 43-44, wherein the semantically segmented eye image comprises a plurality of pixels, and wherein a color value of a pixel of the semantically segmented eye image corresponds to a background of the eye image, a sclera of the eye in the eye image, an iris of the eye in the eye image, or a pupil of the eye in the eye image.

In a 46th aspect, the method of aspect 45, wherein the color value of the pixel of the semantically segmented eye image is a first color value, a second color value, a third color value, or a fourth color, wherein the first color value corresponds to the background of the eye image, wherein the second color value corresponds to the sclera of the eye in the eye image, wherein the third color value corresponds to the iris of the eye in the eye image, and wherein the fourth color value corresponds to the pupil of the eye in the eye image.

In a 47th aspect, the method of aspect 46, wherein the first color value is greater than the second color value, wherein the second color value is greater than the third color value, and wherein the third color value is greater than the fourth color value.

In a 48th aspect, the method of any one of aspects 46-47, wherein determining the pupil contour using the semantically segmented eye image comprises: creating a first binary image from the semantically segmented eye image; determining a longest pupil contour in the first binary image; creating a second binary image from the segmented eye image; removing a longest pupil contour pixel of the longest pupil contour using the second binary image that is inappropriate for determining the pupil contour; and determining the pupil contour as an ellipse from remaining pixels of the longest pupil contour in the first binary image.

In a 49th aspect, the method of aspect 48, wherein a pixel of the first binary image has a first binary image color value if a corresponding pixel in the semantically segmented eye image has a value greater than or equal to the fourth color value, and a second binary image color value otherwise, wherein the first binary image color value is greater than the second binary image color value, and wherein a pixel of the second binary image has the first binary image color value if a corresponding pixel in the semantically segmented eye image has a value greater than or equal to the third color value, and the second binary image color value otherwise.

In a 50th aspect, the method of any one of aspects 48-49, wherein removing the longest pupil contour pixel of the longest pupil contour using the second binary image that is inappropriate for determining the pupil contour comprises: determining a distance between the longest pupil contour pixel and a pixel in the second binary image that has the second binary image color value and is closest to the longest pupil contour pixel; and removing the longest pupil contour pixel from the longest pupil contour if the distance is smaller than a predetermined pupil contour threshold.

In a 51st aspect, the method of aspect 50, wherein determining the distance between the longest pupil contour pixel and the pixel in the second binary image that has the second binary image color value and is closest to the longest pupil contour pixel comprises: determining a distance between a pixel in the second binary image corresponding to the longest pupil contour pixel and the pixel in the second binary image that has the second binary image color value and is closest to the pixel in the second binary image corresponding to the longest pupil contour pixel.

In a 52nd aspect, the method of any one of aspects 48-49, further comprising determining a smallest bounding box enclosing the longest pupil contour in the first binary image.

In a 53rd aspect, the method of aspect 52, further comprising determining a size of the smallest bounding box enclosing the longest pupil contour in the first binary image.

In a 54th aspect, the method of aspect 53, wherein the size of the smallest bounding box enclosing the longest pupil contour in the first binary image is a diagonal of the smallest bounding box enclosing the longest pupil contour in first the binary image.

In a 55th aspect, the method of any one of aspects 53-54, wherein the predetermined pupil contour threshold is a fraction multiplied by the size of the smallest bounding box enclosing the longest pupil contour in the first binary image, and wherein the fraction is in a range from 0.02 to 0.20.

In a 56th aspect, the method of any one of aspects 48-55, wherein determining the iris contour using the semantically segmented eye image comprises: creating a third binary image from the semantically segmented eye image; determining a longest iris contour in the first binary image; creating a fourth binary image from the semantically segmented eye image; removing a longest iris contour pixel of the longest iris contour using the fourth binary image that is inappropriate for determining the iris contour; and determining the iris contour as an ellipse from remaining pixels of the longest iris contour in the first binary image.

In a 57th aspect, the method of aspect 56, wherein a pixel of the third binary image has the first binary image color value if a corresponding pixel in the semantically segmented eye image has a value greater than or equal to the third color value, and the second binary image color value otherwise, and wherein a pixel of the fourth binary image has the first binary image color value if a corresponding pixel in the semantically segmented eye image has a value greater than or equal to the second color value, and the second binary image color value otherwise.

In a 58th aspect, the method of any one of aspects 56-57, wherein removing the longest iris contour pixel of the longest iris contour using the fourth binary image that is inappropriate for determining the iris contour comprises: determining a distance between the longest iris contour pixel and a pixel in the fourth binary image that has the second binary image color value and is closest to the longest iris contour pixel; and removing the longest iris contour pixel from the longest iris contour if the distance between the longest iris contour pixel and the pixel in the fourth binary image is smaller than a predetermined iris contour threshold.

In a 59th aspect, the method of aspect 58, wherein determining the distance between the longest iris contour pixel and the pixel in the fourth binary image that has the second binary image color value and is closest to the longest iris contour pixel comprises: determining a distance between a pixel in the fourth binary image corresponding to the longest iris contour pixel and the pixel in the fourth binary image that has a color value of the second binary image color value and is closest to the pixel in the fourth binary image corresponding to the longest iris contour pixel.

In a 60th aspect, the method of any one of aspects 56-57, further comprising determining a smallest bounding box enclosing the longest iris contour in the third binary image.

In a 61st aspect, the method of aspect 60, further comprising determining a size of the smallest bounding box enclosing the longest iris contour in the third binary image.

In a 62nd aspect, the method of aspect 61, wherein the size of the smallest bounding box enclosing the longest iris contour in the third binary image is a diagonal of the smallest bounding box enclosing the longest iris contour in third the binary image.

In a 63rd aspect, the method of any one of aspects 61-62, wherein the predetermined iris contour threshold is a fraction multiplied by the size of the smallest bounding box enclosing the longest iris contour in the first binary image, wherein the fraction is in a range from 0.02 to 0.20.

In a 64th aspect, the method of any one of aspects 49-63, wherein determining the mask for the irrelevant area in the eye image comprises creating a binary mask image comprising a plurality of pixels, wherein a pixel of the binary mask image has the first binary image color value if a corresponding pixel in the semantically segmented eye image has a value greater than or equal to the third color value, and the second binary image color value otherwise.

In a 65th aspect, the method of any one of aspects 43-64, further comprising creating a polar image of an iris of an eye in the eye image from the eye image using the pupil contour, the iris contour, and the mask for the irrelevant area in the semantically segmented eye image.

In a 66th aspect, the method of any one of aspects 43-65, wherein receiving the semantically segmented eye image of an eye image comprises: receiving an eye image; processing the eye image using a convolution neural network to generate the segmentation of the eye image; and processing the eye image using the convolution neural network to generate a quality estimation of the eye image.

In a 67th aspect, the method of any one of aspects 43-66, wherein receiving the semantically segmented eye image of an eye image comprises: receiving an eye image; processing the eye image using a convolution neural network to generate the semantically segmented eye image; and processing the eye image using the convolution neural network to generate a quality estimation of the eye image.

In a 68th aspect, a computer system is disclosed. The computer system comprises: a hardware processor; and non-transitory memory having instructions stored thereon, which when executed by the hardware processor cause the processor to perform the method of any one of aspects 34-67.

In a 69th aspect, the computer system of aspect 68, wherein the computer system comprises a mobile device.

In a 70th aspect, the computer system of aspect 69, wherein the mobile device comprises a wearable display system. The wearable display system may comprise a head-mounted augmented or virtual reality display system.

In a 71st aspect, a system for eye image segmentation and image quality estimation, the system comprising: an eye-imaging camera configured to obtain an eye image; non-transitory memory configured to store the eye image; a hardware processor in communication with the non-transitory memory, the hardware processor programmed to: receive the eye image; process the eye image using a convolution neural network to generate a segmentation of the eye image; and process the eye image using the convolution neural network to generate a quality estimation of the eye image, wherein the convolution neural network comprises a segmentation tower and a quality estimation tower, wherein the segmentation tower comprises segmentation layers and shared layers, wherein the quality estimation tower comprises quality estimation layers and the shared layers, wherein a first output layer of the shared layers is connected to a first input layer of the segmentation tower and to a second input layer of the segmentation tower, at least one of the first input layer or the second input layer comprising a concatenation layer, wherein the first output layer of the shared layers is connected to an input layer of the quality estimation layer, and wherein the eye image is received by an input layer of the shared layers.

In a 72nd aspect, the system of aspect 71, wherein a second output layer of the shared layers is connected to a third input layer of the segmentation tower, the third input layer comprising a concatenation layer.

In a 73rd aspect, the system of any one of aspects 71 or 72, wherein to process the eye image using the convolution neural network to generate the segmentation of the eye image, the hardware processor is programmed to: generate the segmentation of the eye image using the segmentation tower, wherein an output of an output layer of the segmentation tower comprises the segmentation of the eye image.

In a 74th aspect, the system of any one of aspects 71 to 73, wherein the segmentation of the eye image includes a background, a sclera, an iris, or a pupil of the eye image.

In a 75th aspect, the system of aspect 74, wherein the hardware processor is further programmed to: determine a pupil contour of an eye in the eye image using the segmentation of the eye image; determine an iris contour of the eye in the eye image using the segmentation of the eye image; and determine a mask for an irrelevant area in the eye image.

In a 76th aspect, the system of any one of aspects 71 to 75, wherein the shared layers are configured to encode the eye image by decreasing a spatial dimension of feature maps and increasing a number of feature maps computed by the shared layers.

In a 77th aspect, the system of aspect 76, wherein the segmentation layers are configured to decode the eye image encoded by the shared layers by increasing the spatial dimension of the feature maps and reducing the number of feature maps.

In a 78th aspect, the system of any one of aspects 71 to 77, wherein to process the eye image using the convolution neural network to generate the quality estimation of the eye image, the hardware processor is programmed to: generate the quality estimation of the eye image using the quality estimation tower, wherein an output of an output layer of the quality estimation tower comprises the quality estimation of the eye image.

In a 79th aspect, the system of any one of aspects 71 to 78, wherein the quality estimation tower is configured to output at least two channels of output, wherein a first of the at least two channels comprises a good quality estimation and a second of the at least two channels comprises a bad quality estimation.

In an 80th aspect, the system of any one of aspects 71 to 79, wherein the shared layers, the segmentation layers, or the quality estimation layers comprise a convolution layer, a brightness normalization layer, a batch normalization layer, a rectified linear layer, an upsampling layer, a concatenation layer, a pooling layer, a fully connected layer, a linear fully connected layer, a softsign layer, or any combination thereof.

In an 81st aspect, a system for eye image segmentation and image quality estimation, the system comprising: an eye-imaging camera configured to obtain an eye image; non-transitory memory configured to store the eye image; a hardware processor in communication with the non-transitory memory, the hardware processor programmed to: receive the eye image; process the eye image using a convolution neural network to generate a segmentation of the eye image; and process the eye image using the convolution neural network to generate a quality estimation of the eye image, wherein the convolution neural network comprises a segmentation tower and a quality estimation tower, wherein the segmentation tower comprises segmentation layers and shared layers, wherein the quality estimation tower comprises quality estimation layers and the shared layers, wherein the segmentation layers are not shared with the quality estimation tower, wherein the quality estimation layers are not shared with the segmentation tower, and wherein the eye image is received by an input layer of the shared layers.

In an 82nd aspect, the system of aspect 81, wherein a first output layer of the shared layers is connected to a first input layer of the segmentation tower.

In an 83rd aspect, the system of aspect 82, wherein the first output layer of the shared layers is connected to a second input layer of the segmentation tower, wherein the first input layer or the second input layer comprises a concatenation layer.

In an 84th aspect, the system of aspect 82 or 83, wherein the first output layer of the shared layers is further connected to an input layer of the quality estimation tower.

In an 85th aspect, the system of any one of aspects 81 to 84, wherein to process the eye image using the convolution neural network to generate the segmentation of the eye image, the hardware processor is programmed to: generate the segmentation of the eye image using the segmentation tower, wherein an output of an output layer of the segmentation tower comprises the segmentation of the eye image.

In an 86th aspect, the system of any one of aspects 81 to 85, wherein the segmentation of the eye image includes a background, a sclera, an iris, or a pupil of the eye image.

In an 87th aspect, the system of any one of aspects 81 to 86, wherein to process the eye image using the convolution neural network to generate the quality estimation of the eye image, the hardware processor is programmed to: generate the quality estimation of the eye image using the quality estimation tower, wherein an output of an output layer of the quality estimation tower comprises the quality estimation of the eye image.

In an 88th aspect, the system of any one of aspects 81 to 87, wherein the shared layers, the segmentation layers, or the quality estimation layers comprise a convolution layer, a batch normalization layer, a rectified linear layer, an upsampling layer, a concatenation layer, a pooling layer, a fully connected layer, a linear fully connected layer, or any combination thereof.

In an 89th aspect, the system of aspect 88, wherein the batch normalization layer is a batch local contrast normalization layer or a batch local response normalization layer.

In a 90th aspect, the system of any one of aspects 81 to 89, wherein the shared layers, the segmentation layers, or the quality estimation layers comprise a brightness normalization layer, a softsign layer, or any combination thereof.

In a 91st aspect, the system of any one of aspects 71 to 90, further comprising a display configured to display virtual images to a user of the system.

In a 92nd aspect, the system of aspect 91, wherein the display comprises a light field display or a display configured to display the virtual images at multiple depth planes.

In a 93rd aspect, the system of any one of aspects 71 to 92, wherein the hardware processor is further programmed to calculate a biometric signature from a segmentation of the eye image, wherein the segmentation is generated by the segmentation tower of the convolution neural network.

In a 94th aspect, the system of aspect 93 wherein the biometric signature comprises an iris code.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task (e.g., eye image segmentation and quality estimation using the CNN 100 with the merged architecture) or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for determining eye contours in a semantically segmented eye image, the method is under control of a hardware processor and comprises:
   receiving a semantically segmented eye image of an eye image comprising a plurality of pixels, wherein a pixel of the semantically segmented eye image has a color value,
      wherein the color value of the pixel of the semantically segmented eye image is a first color value, a second color value, a third color value, or a fourth color value,
      wherein the first color value corresponds to a background of the eye image,
      wherein the second color value corresponds to a sclera of the eye in the eye image,
      wherein the third color value corresponds to an iris of the eye in the eye image, and
      wherein the fourth color value corresponds to a pupil of the eye in the eye image;
   determining a pupil contour using the semantically segmented eye image; and
   determining an iris contour using the semantically segmented eye image,
   wherein,
      the pupil contour is determined using a first binary image created based on the semantically segmented eye image, wherein a color value of a first binary image pixel of the first binary image is the fourth color value or the third color value, and/or
      the iris contour is determined using a second binary image created based on the semantically segmented eye image, wherein a color value of a second binary image pixel of the second binary image is the third color value or the second color value.

2. The method of claim 1, wherein the first color value is greater than the second color value, wherein the second color value is greater than the third color value, and wherein the third color value is greater than the fourth color value.

3. The method of claim 1, wherein determining the pupil contour using the semantically segmented eye image comprises:
   determining a pupil contour border;
   removing a plurality of pixels from the pupil contour border; and
   determining the pupil contour as an ellipse from remaining pixels of the pupil contour border.

4. The method of claim 3 wherein determining a pupil contour border further comprises:
   determining contours in the first binary image; and
   selecting a longest contour of the determined contours in the first binary image as a pupil contour border.

5. The method of claim 4, wherein the color value of the first binary image pixel of the first binary image is the fourth color value if a corresponding pixel in the semantically segmented eye image has a value greater than or equal to the fourth color value, and the third color value if the corresponding pixel in the semantically segmented eye image has a value not greater than or equal to the fourth color value.

6. The method of claim 4, comprising:
   determining a pupil contour points bounding box enclosing the pupil contour border;

computing a pupil points area size as a diagonal of the pupil contours points bounding box; and determining a pupil contour threshold based on the pupil points area size.

7. The method of claim 6, wherein the pupil contour threshold is a fraction multiplied by the pupil points area size, and wherein the fraction is in a range from 0.02 to 0.20.

8. The method of claim 3, comprising creating a third binary image comprising a plurality of pixels, wherein a color value of a third binary image pixel of the plurality of pixels of the third binary image is the third color value or the second color value.

9. The method of claim 8, wherein the color value of the third binary image pixel of the plurality of pixels of the third binary image is the third color value if a corresponding pixel in the semantically segmented eye image has a value greater than or equal to the third color value, and the second color value if the corresponding pixel in the semantically segmented eye image has a value not greater than or equal to the third color value.

10. The method of claim 8, wherein removing a plurality of pixels from the pupil contour border comprises, for a pupil contour border pixel of the pupil contour border:

determining a closest pixel in the third binary image that has a color value of the second color value and that is closest to the pupil contour border pixel;

determining a distance between the pupil contour border pixel and the closest pixel in the third binary image; and removing the pupil contour border pixel from the pupil contour border if the distance between the pupil contour border pixel and the closest pixel in the third binary image is smaller than a pupil contour threshold.

11. The method of claim 1, wherein determining the iris contour using the semantically segmented eye image comprises:

determining an iris contour border;

removing a plurality of pixels from the iris contour border; and determining the iris contour as an ellipse from remaining pixels of the iris contour border.

12. The method claim 11, wherein determining the iris contour border comprises:

determining contours in the second binary image; and selecting a longest contour of the determined contours in the second binary image as an iris contour border.

13. The method of claim 12 comprising:

determining an iris contour points bounding box enclosing the iris contour border;

computing an iris points area size as a diagonal of the iris contours points bounding box; and determining an iris contour threshold based on the iris points area size.

14. The method of claim 11, wherein a color value of the second binary image pixel of the plurality of pixels of the second binary image is the third color value if a corresponding pixel in the semantically segmented eye image has a value greater than or equal to the third color value, and the second color value if the corresponding pixel in the semantically segmented eye image has a value not greater than or equal to the third color value.

15. The method of claim 14, wherein the iris contour threshold is a fraction multiple by the iris points area size, and wherein the fraction is in a range from 0.02 to 0.20.

16. The method of claim 11 comprising creating a fourth binary image comprising a plurality of pixels, wherein a color value of a fourth binary image pixel of the plurality of pixels of the fourth binary image is the second color value or the first color value.

17. The method of claim 16, wherein a color value of a fourth binary image pixel of the plurality of pixels of the fourth binary image is the second color value if a corresponding pixel in the semantically segmented eye image has a value greater than or equal to the second color value, and the first color value if the corresponding pixel in the semantically segmented eye image has a value not greater than or equal to the second color value.

18. The method of claim 16, wherein removing a plurality of pixels from the iris contour border comprises, for an iris contour border pixel of the contour border:

determining a closest pixel in the fourth binary image that has a color value of the first color value and that is closest to the iris contour border pixel;

determining a distance between the iris contour border pixel and the closest pixel in the fourth binary image; and removing the iris contour border pixel from the iris contour border if the distance between the iris contour border pixel and the closest pixel in the fourth binary image is smaller than an iris contour threshold.

19. The method of claim 1 comprising determining a binary mask to cover an irrelevant area in the semantically segmented eye image.

20. The method of claim 19 wherein determining the binary mask to cover the irrelevant area in the eye image comprises:

creating a binary mask image comprising a plurality of pixels, wherein a binary mask image pixel of the binary mask image has a color value;

setting the color value of the binary mask image pixel to the third color value if a corresponding pixel in the semantically segmented eye image has a value greater than or equal to the third color value; and setting the color value of the binary mask image pixel to the second color value if a corresponding pixel in the semantically segmented eye image has a value not greater than or equal to the third color value.

21. The method of claim 19 wherein the irrelevant area comprises a portion of the semantically segmented eye image outside of an area defined by the iris contour.

22. The method of claim 19, comprising:

applying the binary mask to the semantically segmented eye image to generate a relevant eye image comprising a portion of the eye image that excludes the irrelevant area; and calculating a biometric signature from the relevant eye image.

23. The method of claim 22, wherein the biometric signature comprises an iris code.

24. The method of claim 1, further comprising creating a polar image of an iris of an eye in the eye image from the eye image using the pupil contour, the iris contour, and the mask for the irrelevant area in the semantically segmented eye image.

25. The method of claim 1, wherein receiving the semantically segmented eye image of an eye image comprising a plurality of pixels comprises:

receiving an eye image;

processing the eye image using a convolution neural network to generate the semantically segmented eye image; and processing the eye image using the convolution neural network to generate a quality estimation of the eye image,
  wherein the convolution neural network comprises a segmentation tower and a quality estimation tower,
    wherein the segmentation tower comprises segmentation layers and shared layers,
  wherein the quality estimation tower comprises quality estimation layers and the shared layers,
  wherein a first output layer of the shared layers is connected to a first input layer of the segmentation tower and a second input layer of the segmentation tower,
  wherein the first output layer of the shared layers is connected to an input layer of the quality estimation layer, and
  wherein receiving the eye image comprises receiving the eye image by an input layer of the shared layers.

\* \* \* \* \*